United States Patent [19]

Rhodes et al.

[11] Patent Number: 4,535,453
[45] Date of Patent: Aug. 13, 1985

[54] SIGNALING INPUT/OUTPUT PROCESSING MODULE FOR A TELECOMMUNICATION SYSTEM

[75] Inventors: Robert B. Rhodes, Plantation; James R. Paolantonio, Coral Springs, both of Fla.

[73] Assignee: Siemens Corporate Research & Support, Inc., Iselin, N.J.

[21] Appl. No.: 453,858

[22] Filed: Dec. 27, 1982

[51] Int. Cl.³ .......................... H04J 3/12; H04Q 11/04
[52] U.S. Cl. ..................................... 370/110.1; 370/58
[58] Field of Search .......................... 370/110.1, 85, 58; 179/18 EA, 18 ES

[56] References Cited

U.S. PATENT DOCUMENTS

| 4,168,469 | 9/1979 | Parikh et al. | 370/85 |
| 4,242,749 | 12/1980 | Takezoe | 370/85 |
| 4,256,926 | 3/1981 | Pitroda et al. | 370/58 |
| 4,331,835 | 5/1982 | Gueldner et al. | 179/18 ES |
| 4,371,925 | 2/1983 | Carberry et al. | 370/85 |
| 4,432,089 | 2/1984 | Wurzburg et al. | 370/110.1 |
| 4,455,647 | 6/1984 | Gueldner | 370/85 |

Primary Examiner—Douglas W. Olms
Assistant Examiner—Wellington Chin
Attorney, Agent, or Firm—Thomas H. Jackson

[57] ABSTRACT

An input/output processing module utilized for processing of signaling information and arranged in a central control unit of a local central office of a digital telecommunications system. Each central office further includes a central switching network and a plurality of trunks dedicated to common channel signaling each locally associated with a signaling link controller unit. Within the processing module, a microprocessor system is provided for initiating, starting and controlled resetting of transfers of signaling information under supervision of the central control unit. The signaling link controllers utilized for common channel signaling are residing on a separate signaling link bus. A signaling link bus control arrangement is connected to both the microprocessor system and the signaling link bus and includes programmable control means for sequentially executing transfer operations of signaling information. Interface means are independently accessible by both the microprocessor system and the control means of the signaling link bus control arrangement for enabling bi-directional data transfers between the microprocessor system and the bus control arrangement.

21 Claims, 20 Drawing Figures

| D7 | D6 | D5 | D4 | D3 | D2 | D1 | D0 |
|----|----|----|----|----|----|----|----|
| COMMAND | | | SAD4 | SAD3 | SAD2 | SAD1 | SAD0 |

| D7 | D6 | D5 | D4 | D3 | D2 | D1 | D0 |
|----|----|----|----|----|----|----|----|
| PRES | 0 | WD | MSTR | DIAG | CH2 | CH1 | MSG |

| D7 | D6 | D5 | D4 | D3 | D2 | D1 | D0 |
|----|----|----|----|----|----|----|----|
| ERR | SWD | REQ | SAD4 | SAD3 | SAD2 | SAD1 | SAD0 |

SIGNALING INPUT/OUTPUT PROCESSING MODULE FOR A TELECOMMUNICATION SYSTEM

BACKGROUND OF THE INVENTION

The invention is related to a digital telecommunication system with stored program control, and more specifically, to a common channel signaling input/output processing module of such a telecommunications system utilized for inter-office signaling.

The central switching equipment of a digital telecommunications system conventionally is composed of three major sections. Line trunk group units provide interfaces to the transmission paths of the telecommunication system and are, in turn, commonly connected to a central switching network. The core of the central switching system is a central control which governs the operation of the line trunk group units and the central switching network as well. In view of the fact that controlling of the switching process in a larger digital telecommunication network comprises a multiplicity of interrelated control operations, it is conceivable that the switch control has a decentralized structure wherein the central control becomes a master to direct the actions of the subordinate sections which comprise control capabilities designed to perform specialized tasks.

Such a decentralized control concept necessitates quite some exchange of control information conventionally designated as signaling information in both directions between the central control and specialized control units arranged in other sections of the system. One conventional solution to this control data transfer problem is often called "Common Channel Signaling" comprising a communication link between the central control and peripherals separate from individual and temporary information communication links.

Common channel signaling can be of special significance in telecommunication networks constructed of a plurality of central offices interconnected by trunks terminating in line trunk group units of respective ones of the central offices. One trunk of each respective inter-office connection is dedicated to common channel signaling and is associated with a peripheral control unit here designated as signaling link controller. The signaling link controllers SLC itself have information processing capabilities for processing the signaling information on the trunk group level.

More specifically, a central processor system forming the core of a local central control communicates across separate transmission lines with selected ones of the signaling link controllers in order to steer and monitor switching processes involving remote central offices of corresponding design. In fact, this means that a separate input/output transfer subsystem has to be designed for bi-directional transfer of signaling information for this purpose. It may be noted that this information is interpreted as data information within this subsystem in contrast to further control information which specify the control parameters just for performing this specialized signaling information transfer.

One advantage of such a decentralized control is that processing levels are established which are dedicated to limited tasks, and information is processed on these different levels simultaneously. In this manner, the signaling information can be processed easier under real time conditions and enables the switching system to handle a multiplicity of simultaneous operations at a high data rate without loss of voice or data information to be transferred through the switching system. Nevertheless, the processing of signaling information and the transfer of this information in itself requires quite an amount of the capacity of the central control. This aspect of transferring and processing signaling information becomes more and more important with increasing size and complexity of the digital telecommunication system. In other words, the higher the amount of data traffic between the connected central offices, the more desirable it is to dedicate trunks as common signaling channels for accomplishing the data traffic between pairs of such central offices.

SUMMARY OF THE INVENTION

It is therefore a general object of the present invention to provide central switching equipment for a digital telecommunication system with a central control having improved capabilities for transferring and processing of signaling information.

A further object is to provide such an improved central control including a central processor system which forms the master for an independently operating input/output subsystem including signaling link controllers, each provided for processing of signaling information on a local level and associated with a trunk dedicated for transferring signaling information to a remote central office.

Still another object of the present invention is to provide such an input/output subsystem which has sufficient processing capabilities to relieve the central processing system from executing input/output operations and, in addition, various test and monitoring functions, such as monitoring the current signaling link controller statuses for availability, transfer requests, etc.

A further object of the present invention is to provide a distinct hardware and firmware structure of the input/output subsystem which meets its requirements, as outlined above, and allows for an efficient data transfer between relatively independently operating processing modules by means of well established procedures, thereby supporting a high standard of system availability.

These objects as various other objects which will become apparent from the description which follows, are achieved in accordance with the present invention by means of an input/output processing module for providing common channel signaling wherein a microprocessor system is provided for initiating, starting and controlled resetting of signaling information transfer operations under control of the central processing system by means of respective commands. To this regard, the microprocessor system is composed of a system bus interface unit connected to the central system bus, a microprocessor unit, a local memory unit and a microprocessor bus inter-connecting these units. The input/output processing module, furthermore, includes another bus arrangement constituting a signaling link bus which is commonly connected to signaling link controllers each associated with a respective signaling trunk, and still includes a signaling link bus control arrangement connected with both the microprocessor bus and the signaling link bus. This control arrangement provides programmable control means for sequentially executing transfer operations of signaling information and related input/output control information, and interface means which are independently accessible by both the microprocessor system and the control means of the signaling link bus control arrangement for enabling bi-directional data transfers between the microprocessor system and the control means.

This structure for processing of common channel signaling between central offices provides for the central processing system of the local central control to become a master for performing input/output operations of signaling information. The central processing system controls the input/output processing module dedicated to the tasks of monitoring the signaling link controllers for transfer requests, and of establishing temporary communication links with selected ones of the signaling link controllers for exchange of signaling information. These tasks require quite some processing capability, especially in view of the real time conditions occuring in such a digital telecommunications system. This load would be much too high for a relatively small conventional microprocessor system in itself. For this reason, the input/output processing module is designed such that the signaling link controllers are residing on a separate bus, the signaling bus which may be duplicated for redundancy. A control structure governing the access to these signaling link controllers is provided which is composed of two further sections: a conventional microprocessor system and a dedicated programmable controller arrangement which controls the actual data transfers across the signaling link bus. These two control sections of the input/output processing module operate relatively independently from each other. For this reason, interface means are arranged for intermediate storing of information provided by one section and for retrieval by the other section. Storing and retrieval is performed in accordance with the operation cycle of the respective section.

Looking at the processing of signaling information, several processing levels will be recognized. A signaling link controller processes the signaling information on the level of a line trunk group unit and forwards all related control information to the local central control unit of the telecommunication system. The signaling link controllers are not enabled to actively communicate with the associated local central control unit, they only can request transfers which have to be acknowledged by the superordinate control level. This control level is established by means of the signaling link bus control arrangement which, in turn, is governed by the microprocessing module. This module itself is a specialized processor which is under indirect control of the main central processing system. Since the processing of signaling information on each of these levels in different stages can be performed simultaneously, relatively small programmable control units can perform the tasks on each level, even with limited processing capabilities.

In accordance with a preferred embodiment of the present invention, this concept of distributed processing levels is further refined by including into the microprocessor system a direct memory access control unit which controls the routine movement of data between the local memory unit and the signaling link bus control arrangement. The microprocessor and this large scale integrated direct memory access (DMA) controller unit share control of the local multiplexed microprocessor bus comprising address and data lines. Two direct memory access channels are used for transferring data from the signaling link bus controller to the local memory unit and from the local memory unit to the signaling link bus controller, respectively.

BRIEF DESCRIPTION OF THE DRAWINGS

A better understanding of the invention may be had by reference to the following description of a preferred embodiment in conjunction with the accompanying drawings, in which.

DESCRIPTION OF THE PREFERRED EMBODIMENT

Figure 1:
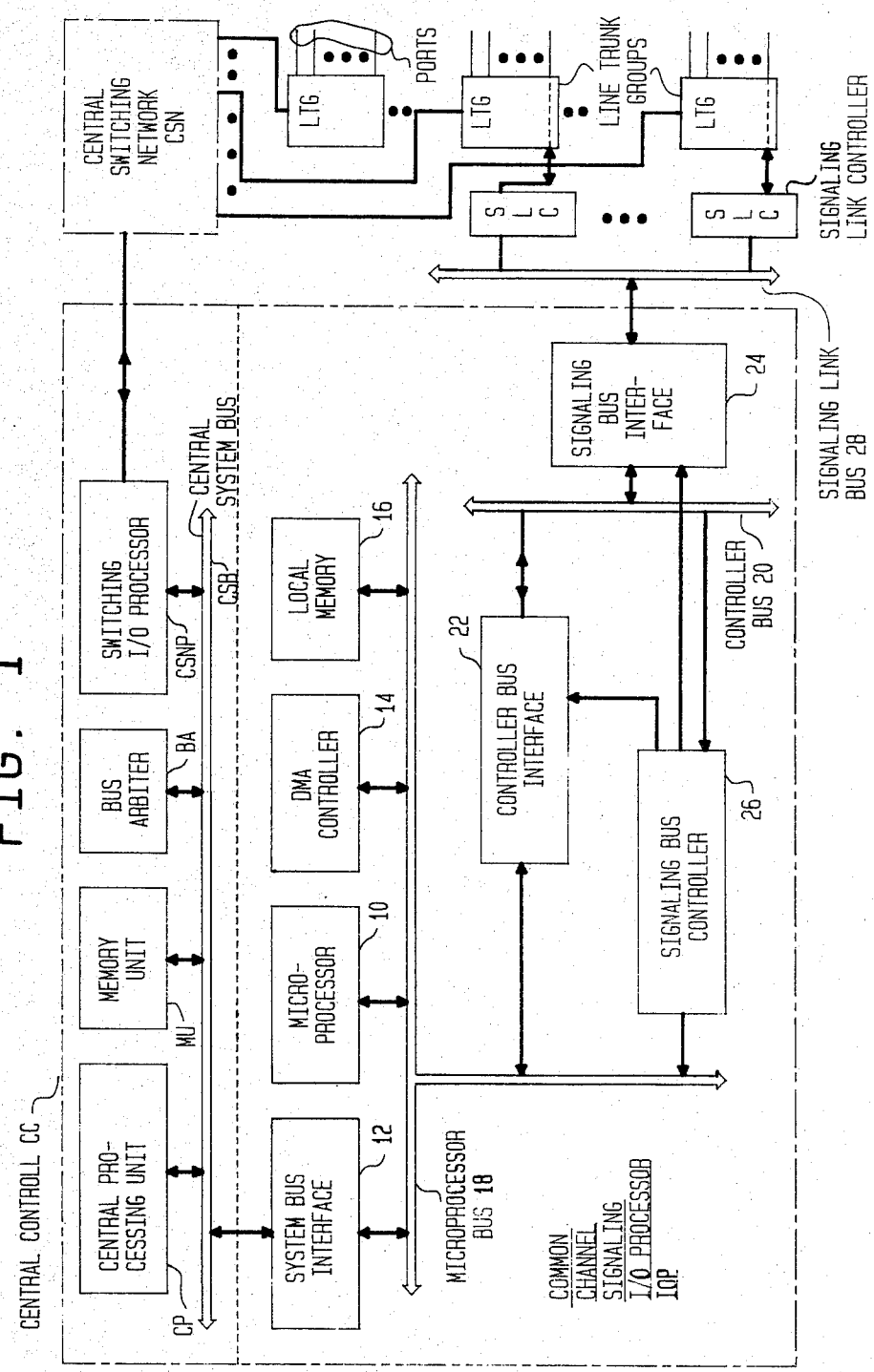
FIG. 1 shows a block diagram of a central office of a switching network including a common control comprising, among others, the common channel signaling input/output processor constructed of a microprocessor system and a sequencing controller designated as signaling bus controller.

The block diagram in FIG. 1 represents the basic composition of a common channel signaling input/output processing module and the surrounding major sections of a central office of a digital telecommunications network illustrating this central office to an extent which is desirable for a detailed understanding of the invention.

The underlying digital telecommunications system is a digital pulse code modulation switching system having central offices designed to function as an end office, intermediate office, tandem switching center or private automatic branch exchange. Several central offices may be interconnected to construct a switching network. Each switching center is provided with a two-level decentralized control structure wherein a central control CC acts as a master directing the actions of subordinate units designated as line trunk groups LTG. Each line trunk group LTG is a link to the "outside" world, that is, an interface between the local switching equipment and the analog or digital lines in the form of subscriber lines connected to terminal units or trunks interconnecting central offices.

A central switching network CSN includes at least one time switch unit which is interconnected with the line trunk groups LTG across standardized information highways handling the speech information. Communication links connect the central control CC to the central switching network CSN and the line trunk groups LTG for control information.

The transfer of such control information, here of specific interest, is performed in the manner of so-called "common channel signaling" between each of the central offices across trunks dedicated for transferring signaling information. The respective local end of each signaling trunk is associated with a signaling link controller SLC which establishes the interface to the central control CC of the ocal central office and constitutes itself limited signaling processing capability.

The operation of the central control, in itself, is of less concern in conjunction with the present invention and the unit, therefore, is represented in FIG. 1 in a more generalized form. The main section of the central control CC is formed by a central processing unit CP which communicates across a central system bus CSB with a main memory unit MU and several other control system units, such as a bus arbiter BA and separate input/output processors. These processors handle the input/output data transfer of the central control CC with other sections of the switching system. One application is a switching input/output processor CSNP assigned to control the data transfer between the central control CC and the central switching network CSN; another one of these processors is the input/output processor for common channel signaling, referred to as signaling input/output processor IOP, and in short form signaling IOP.

Several sections of the central control CC are represented in FIG. 1 just for background information, but the signaling IOP is of main interest and shown in more detail.

It comprises a microprocessor system including a 16-bit microprocessor 10. A system bus interface unit 12 is arranged between the central system bus CSB and the microprocessor system providing interconnection.

The microprocessor 10 is relieved of the control of input/output transfers by means of a direct memory access (DMA) controller 14 for initiating data transfers to and from a local memory 16 of the microprocessor system independently from the control of the microprocessor 10. All these mentioned sections of the microprocessor system are interconnected by a microprocessor bus 18 which represents here a 16 bit data bus and local address bus.

Another main section of the signaling IOP is a control module which performs the actual input/output transfers of control signals and data to and from the connected signaling link controllers SLC of the various line trunk groups LTG across a signaling link bus 28. This control module comprises a separate controller bus 20 which is connected to the microprocessor bus 18 by a controller bus interface unit 22 and to the signaling bus 28 across a signaling bus interface unit 24. All data transfer across the controller bus 20 takes place under control of a signaling bus controller 26 which is designed as a programmable sequencing device for activating various subunits of the controller bus interface 22 and the signaling bus interface 24, respectively which will become more apparent later from a more detailed description.

In general, the signaling IOP comprises a single port input/output processor residing on the central system bus CSB. In addition to the input/output operations normally associated with any such input/output processor, this processor performs the more complex functions of processing signaling information. It serves as a bus controller for a plurality of signaling link controller modules SLC that reside on the signaling link bus 28. The basic functions of the signaling IOP include interface means to the central system bus CSB and the signaling link bus 28, as well. It comprises the processing unit for one processing level of signaling information. It includes a signaling link bus controller and also an interface between the microprocessor system and this signaling link bus controller. In addition, it handles processor and controller resets, provides time-out watchdogs and monitors power supply lines of the signaling link controllers SLC, among others.

The mentioned various functions of the signaling IOP and the units provided therefore will be described in more detail in the following.

Figure 2:
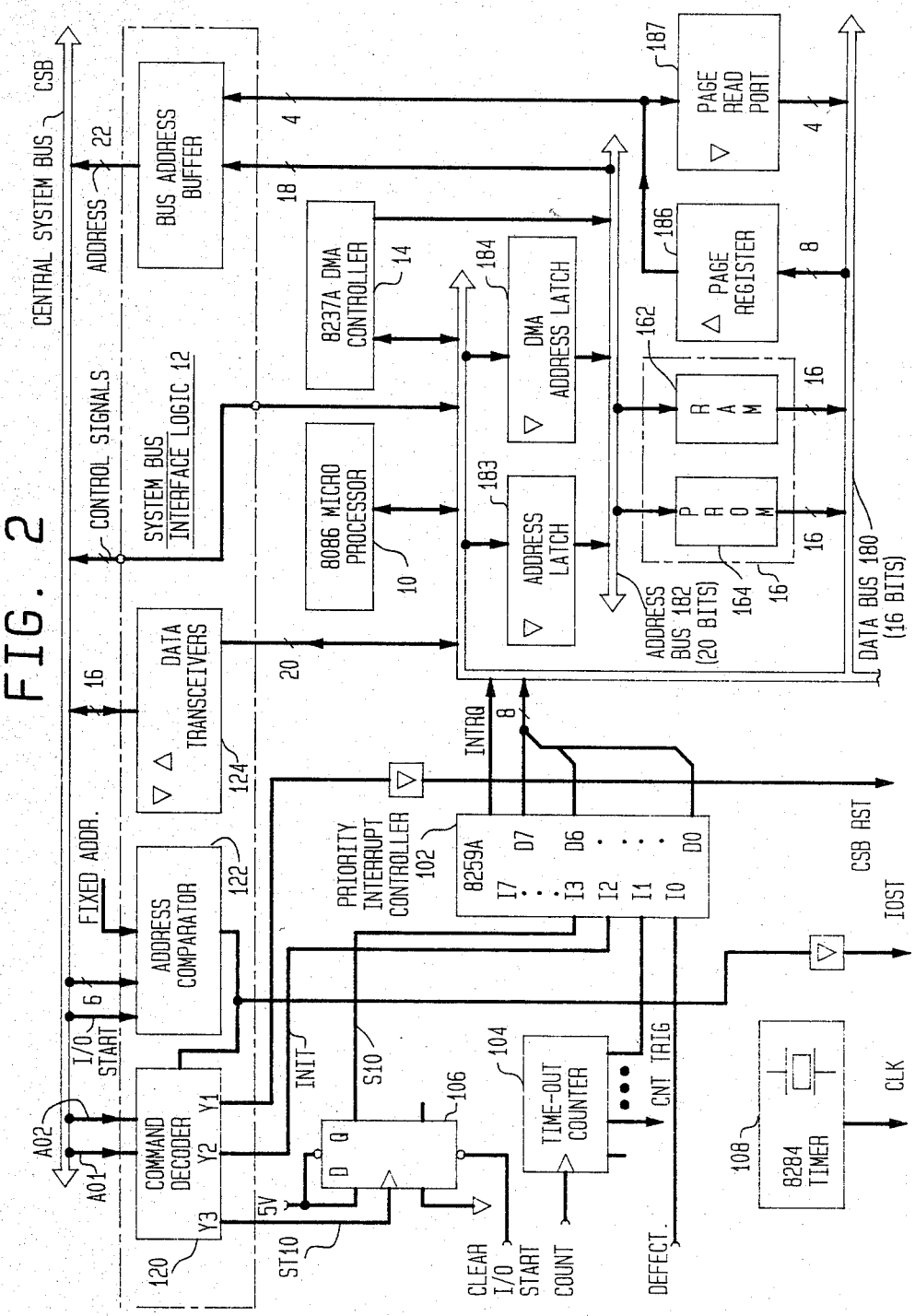
FIG. 2 is a more detailed block diagram of a microprocessing system forming a major section of the signaling input/output processor and communicating with the remainder of the common control across a central system bus.

FIG. 2 represents a more detailed block diagram of the microprocessing system of the signaling IOP. As a subscriber to the central system bus CSB, the signaling IOP can initiate a bus transaction by requesting a cycle of the central system bus CSB from the bus arbiter BA. When this bus is granted the signaling IOP is capable of performing 16 bit memory input or output transfers. The memory address range of the signaling IOP extends over the entire range of the central processing system of 22 address bits which designate a memory capacity of 4 M bytes.

The signaling IOP is capable of responding to three commands of the central control CC through the system bus interface logic 12. These commands are "RESET", "INITIALIZE" and "START INPUT/OUTPUT" which are received and decoded by a command decoder 120 when the signaling IOP is addressed by means of a physical address furnished on the central system bus. A control signal I/O START delivered across the central system bus CSB activates an address comparator 122 of the system bus interface 12 to interrogate the address portion of an input/output write command present at the central system bus CSB. The comparator compares this data to a fixed address and furnishes an output control signal IOST which indicates the start of an input or output operation across the central system bus CSB if the compared addresses are identical.

Figure 3:
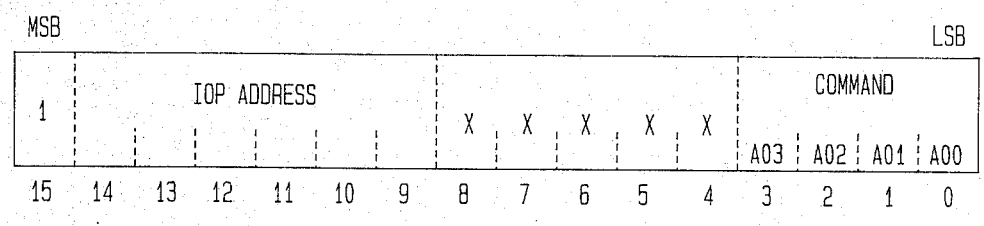
FIG. 3 is a schematic representing the format of an address portion of this central system bus for selecting the signaling input/output processor.

The format of the central system address bus forming a part of the central system bus CSB is represented in FIG. 3. This diagram shows the 16 bit address field comprising four sections. The most significant bit position MSB is always in condition "1" when an input/output transfer is present at the central system bus CSB. The next following six bits of lower order determine an input/output processor address. The positions of the third section of the address field are not relevant in this case which is represented by "X".

The four lower most bit positions including the least significant bit LSB provide the command code.

Table 1 below shows the three conditions of this four bit section each determining a respective one of the commands issued to the signaling IOP.

TABLE 1

| CSB ADDRESS BITS | | | | |
|---|---|---|---|---|
| AO3 | AO2 | AO1 | AO0 | COMMAND |
| 1 | 1 | 0 | 1 | RESET |
| 1 | 0 | 1 | 1 | INITIALIZE |
| 0 | 0 | 0 | 1 | START I/O |

Turning back to FIG. 2, the command "RESET" has the same effect as a power-up reset of a conventional Intel 8086 microprocessor system and forces the microprocessor 10 to address a respective section of its local control memory 16 to be described later. This is achieved by means of a reset signal CSB RST generated by the command decoder 120 upon receipt of this command. The command "INITIALIZE" causes another control signal INIT to be furnished by the command decoder which, in turn, modifies the microprocessor operation to perform an initialization routine wherein address pointers are picked up and stored in the local memory 16 of the microprocessor 10. These address pointers designate the communication area of the central memory unit MU which is reserved for the signaling IOP.

The command "START I/O" is used by the central processing system as an alert to the signaling IOP that additional messages have been queued. A corresponding output signal of the command decoder 120 is latched into a control flipflop 106 which is reset by a control signal CLEAR I/O START generated by the microprocessor system at the end of an input/output routine. The set condition of this flipflop is represented by an output signal SIO.

Two further units of the system bus interface logic 12 form conventional data transceivers 124 comprising a bidirectional 16 bit input/output port connected to the data section of the central system bus CSB and a conventional bus address buffer 126 which stores a 22 bit output address providing access of the signaling IOP to the memory unit MU of the central control processing system.

The processing unit of the signaling input/output processor CCSP comprises a 16-bit microprocessor 10 and associated support circuits. The utilized microprocessor is the commercially available processing circuit 8086 of Intel and correspondingly several other subunits of the processing system are constructed of respective Intel circuits. Various specifications and application notes of the manufacturer are available and detailed circuit description of these components, as such, is deemed not to be necessary.

Nevertheless, the system will be described to an extent which is sufficient for a complete understanding of the microprocessor's operation. The microprocessor 10 controls access to the central system bus CSB through the described system bus interface logic 12 and indirectly controls the flow of data on the signaling link bus 28 by interaction with the signaling bus controller 26. The microprocessor 10 also has access to on-board local memories comprising a 32 Kbyte random access memory (RAM) 162 and a 32 Kbyte programmable read only memory (PROM) 164 for local program storage.

The control of the local multiplexed address/data microprocessor bus 18 is shared by the microprocessor 10 with the DMA controller 14. The DMA controller 14 is a standard controller circuit 8237 A manufactured by Intel. This circuit eases the processing load on the microprocessor 10 by controlling the routine movement of data between the local RAM 162 and the signaling bus controller 26. This DMA controller circuit 14 is equipped with four DMA channels. In this application one of these channels is dedicated to data transfers from the signaling bus controller 26 to the local RAM 162. Correspondingly, transfers on this channel are defined as input data transfers. The second DMA channel is dedicated to output data transfers from the local RAM 162 to the signaling bus controller 26. The two further DMA channels are not used in this application.

The normal processing routine of the microprocessor system can be interrupted by either one of two methods. The utilized microprocessor circuit has a non-maskable interrupt(NMI) which is triggered by a failure of the common control hardware as will become more apparent later. This interrupt allows for an orderly termination of processing in the event of impending switchover to redundant hardware units.

A second group of interrupts is controlled by a priority interrupt controller (PIC) 102 provided in the microprocessor system. This interrupt controller 102 is constructed of the conventional integrated circuit 8259A of Intel. The priority interrupt controller 102 has eight interrupt inputs IO through 17 to accept different interrupt requests. For simplification, in the block diagram of FIG. 2 only selected ones of these interrupt inputs are actually connected to respective units of the microprocessor system, however, the following description will explain the various interrupt conditions. One interrupt request received at interrupt input IO designates a failure of the common control CC and is, in fact, received across the central system bus CSB. Another interrupt input I1 receives a time-out condition which is derived from a time-out counter 104 constructed of a conventional binary counter circuit activated by an internal count pulse Count generated by the signaling link bus controller, as described later in more detail. This pulse is divided by the counter to a period of 3.28 milliseconds and, accordingly, an interrupt signal occurs after each of these periods.

This interrupt signal provides a timing reference to the microprocessor and a periodic request for a watchdog refresh.

The third interrupt input I2 of the interrupt controller 102 receives the output signal INIT of the command decoder 120 which signal represents the initialization condition.

Another interrupt condition received at interrupt input I3 comprises the control condition for the start of an input/output routine. This is achieved by furnishing the output signal SIO of the control flipflop 106 to this interrupt input I3.

The interrupt condition furnished to interrupt input I4 is a controller-timed interrupt which indicates that the signaling bus controller 26 has received, but failed to complete the last command issued to it, as will become more apparent later.

The sixth interrupt condition received at the interrupt input I5 indicates the normal completion of an interrupt type command by the signaling link bus controller 26. Upon receipt of this interrupt condition the controller status and command results are available, which also will be discussed later in more detail. Two further interrupt inputs I6 and I7 of the interrupt controller 102 are not used in this application.

The microprocessor system operates on an 200ns clock pulse rate generated by an internal timer 108 including a conventional timer circuit 8284A manufactured by Intel. The timer 108 will be described later in more detail in conjunction with FIG. 5.

The bus structure of the microprocessor system represented in FIG. 1 just in the form of a basic concept is illustrated in more detail in FIG. 2 in conjunction with supporting devices. The block diagram of FIG. 2 distinguishes a 16 bit microprocessor data bus 180 and a local 20 bit address bus 182. As interfaces to the address bus 182 there are provided two address latches 183 and 184 for buffering addresses under control of the microprocessor 10 and the DMA controller 14, respectively. A page register 186 and a page read port 187 are connected to the data bus 180.

Figure 4:
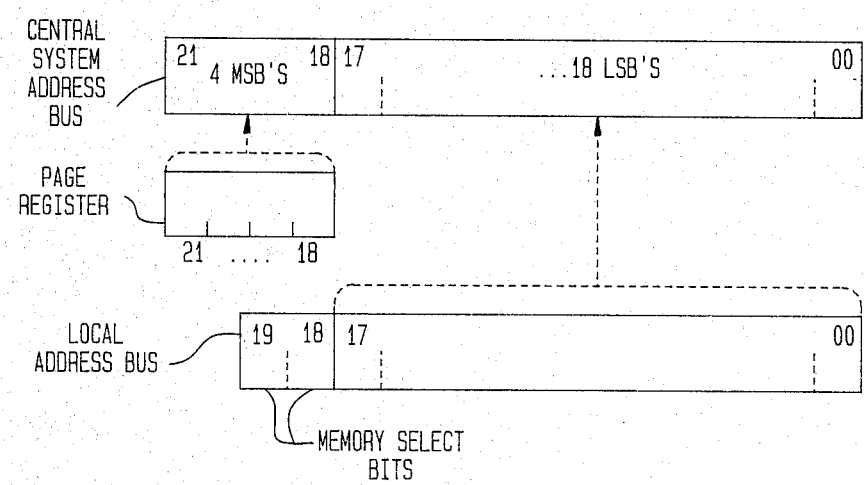
FIG. 4 is a further schematic showing the composition of an address to be delivered to the central system bus when the signaling input/output processor requests access.

This structure allows for expanding the addressing capability of the signaling input/output processor IOP to an address space of 4 Mbyte corresponding to 22 address bits which corresponds to the 22 inputs and outputs of the system bus address buffer 126. FIG. 4 represents in form a schematic the format of this address to be furnished to the central system bus CSB. The 18 least significant address bits which are local address bits designate an address within a 256 Kbyte memory page; the current contents of the page register 186 provide the four most significant bits of the central system bus address.

This page register is loaded and read under program control of the signaling input/output processor IOP by use of the two most significant address bits from the local address bus 182. These two local address bits A18 and A19 are used by a four bit selector, not shown in FIG. 2, to select the available memory space in the manner represented in Table 2.

TABLE 2

| ADDRESS BITS | | MEMORY | ADDRESS |
|---|---|---|---|
| A19 | A18 | SELECTED | RANGE |
| 0 | 0 | LOCAL | 0 ÷ 256K |
| 0 | 1 | SYSTEM | FIXED PAGE ADDRESS |
| 1 | 0 | SYSTEM | VARIABLE PAGE ADDRESS |
| 1 | 1 | LOCAL | TOP OF PROM |

One of these bit combinations determines the local memory 16 comprising the random access memory 162 and the programmable read only memory 164. The address organization of the local memory is established such that the lower 32 Kbyte designate PROM addresses and the next following 32 Kbyte are assigned to the RAM addresses. The upper portion above 64 Kbyte within the theoretically designated local memory page of 256 Kbyte is not used.

The second address bit combination determines an address range within the central system memory MU which is associated with a fixed page address. The third bit combination determines an address range which is assigned to variable page addresses. The fixed page address places the system address within the upper 256 Kbyte of the first Mbyte for access of control variables without disturbing the contents of the page register 186. The variable page address is routinely changed to allow access to the full 4 Mbyte system address range.

For this reason, the page register 186 is constructed of an 8 bit register which contains both the fixed and variable page addresses that are used to set the four most significant bits of the system memory address being accessed by the signaling input/output processor IOP. The four most significant bits of the register contents represent the fixed page address, whereas the four lower bit positions of the register are reserved for the variable page address. In contrast to the variable page address, the fixed page address cannot be read by the microprocessor system; for this reason, there is arranged the page read port 187 which receives this variable page address from the page register 186.

The last bit condition, shown in Table 2, refers to a specific operating condition of the microprocessor system. During a hardware reset, the microprocessor 10 is forced to a specific address of the local PROM 162 for initiating a reset routine.

This control routine is stored in the top part of this control memory and, therefore, the reset address must be transformed into a respective one of the highest available addresses of this memory.

In the following, the specific signals and voltages used for inter-communication between the central system and the signaling input/output processor CCSP are summarized. Any data transfer is carried out across the 16 data lines D00 through D15 which are active high. These data lines are inter-connecting the data section of the central system bus CSB and the data transceivers 124. Correspondingly, there are provided 22 bi-directional address lines which are active low. In addition to these data and address lines, there are implemented several connections for furnishing control signals and voltages. These connections are either represented individually in FIG. 2 or are schematically indicated by a multiple line referenced control lines. One of these control signals is the control signal "I/O START" mentioned above which alerts the signaling input/output processor IOP of command information transferred.

The bus arbiter BA of the central processing system sends this control signal to force the microprocessor system to an input/output start condition.

The signaling input/output processor IOP requests an operation cycle on the central system bus CSB from the bus arbiter BA by means of an individual request signal CSB REQ.

The signal is active low and remains active until the central system bus CSB is allocated to the requesting device. Such allocation is accompanied by a grant signal CSB GRNT which is active low and carried on an individual line from the bus arbiter BA to the signaling input/output processor IOP. The bus arbiter BA grants the central system bus CSB to the requesting processor for one bus cycle and this occurs no sooner than 150 ns after the request has been received.

A further control signal is a READY signal transferred across a bidirectional line. The line condition when driven low by the bus arbiter BA indicates that the signaling input/output processor IOP requires WRITE data from the central system bus CSB or transfers READ data to this bus. When the control signal is driven low by the signaling input/output processor IOP, it indicates that this processor has been selected and that a condition "start input/output" is active, which is accompanied by the corresponding internal control signal SIO.

A read/write condition $\overline{\text{RD}}/\text{WR}$ is established as a tri-state loop in which the signaling input/output processor IOP indicates whether the current condition is a read or write cycle. This signal is switched to the central system bus CSB under control of the grant signal CSB GRNT and is active during the entire bus cycle.

The signaling input/output processor IOP is enabled by means of a further control signal $\text{M}/\overline{\text{IO}}$ to indicate whether the current request is to access the system memory unit MU or an input/output unit. This signal is switched to the central system bus CSB under control of the control signal GRANT and is active until the end of the bus cycle. A data byte enable signal $\overline{\text{BHE}}$ which is also established as a tri-state signal indicates by its low level that the upper data byte on the central system bus CSB is to be read or written. This control signal is active during the entire bus cycle and is sent by the requesting microprocessor.

Finally, the operational status of the common control CC is indicated by means of a control signal "GOOD/-DEF." which indicates in low level condition the good status of the common control CC.

Figure 5:
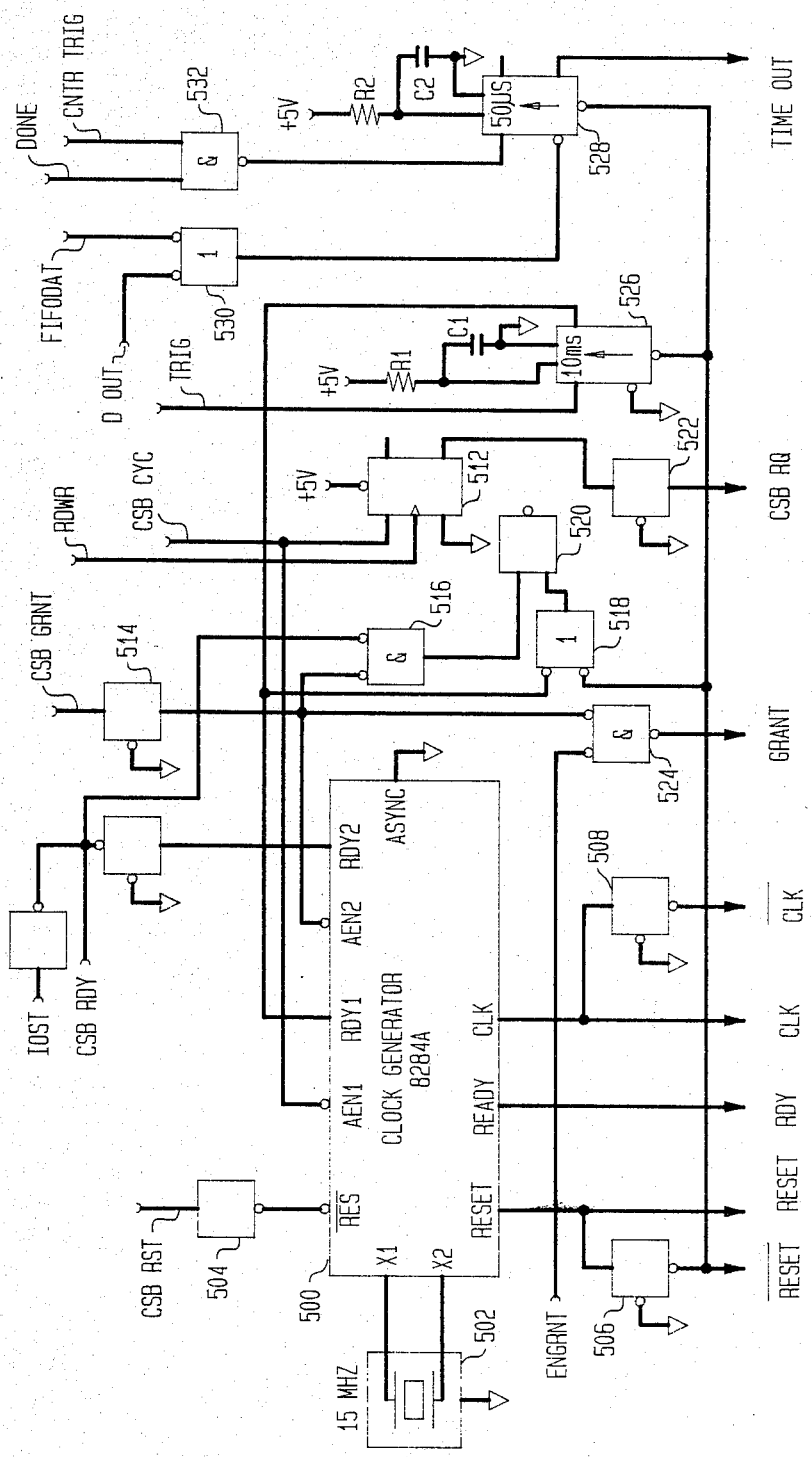
FIG. 5 is a block diagram of a timer unit of the microprocessing system represented in FIG. 2.

The timer unit 108 of the microprocessing system is represented in more detail in a block diagram shown in FIG. 5. The main components of this timer unit are a timing circuit 500 constructed of a conventional integrated circuit 8284A manufactured by Intel and a 15 MHZ crystal oscillator 502. The remaining circuitry comprises logic circuits to establish the correct levels of the control signals supplied to the timer circuit 500 and, in addition, circuits to provide for the refresh and watchdog operations.

As previously described in conjunction with the command decoder 120, a reset signal CSB RST is generated when a reset command is received across the central system bus CSB. This signal is inverted by an inverter 504 and applied to the reset input of the clock generator 500. In accordance with the design of the clock generator, the internal reset signal RESET for initiating the corresponding reset routine of the microprocessor is generated. In addition, the inverted form of this signal is generated by an inverting tri-state line driver 506 which controls the watchdog operation to be described later in more detail.

A clock output of the clock generator furnishes the internal clock pulse train CLK for the microprocessing system. For the signaling bus controller 26 this pulse train is made available in inverted form by means of a further tri-state line driver 508. A further output of the clock generator 500 produces a ready signal RDY which is supplied to the microprocessor 10.

The normal operation of the clock generator 500 is controlled by means of several enable and ready signals in accordance with the manufacturer's specifications of this circuit. One pair of enable inputs AEN1 and AEN2 receive the control signals CSB CYC and CSB GRNT, respectively which signals are control signals governing a cycle of the central system bus CSB concerning the signaling input/output processor IOP. The first ready input RDY1 receives an internally derived control signal which is generated in conjunction with the watchdog refresh, as will be explained in more detail later.

The second ready input RDY 2 is connected across a further tri-state line driver to receive a ready signal CSB RDY transferred across the central system bus CSB and the input/output start control signal IOST generated by the address comparator 122 as described above in conjunction with FIG. 2.

The timer unit also comprises a flipflop 512 which is designated the bus request flipflop. When this flipflop is set, a transaction across the central system bus CSB is initiated. The flipflop is primed by the mentioned cycle control signal CSB CYC and is fed by a high to low transition of either the read or write control line which transitions cause the corresponding read/write control signal CSB RQ to be set. The bus request flipflop 512 remains set until it is cleared by the qualified bus grant signal CSB GRNT. The term called "qualified" describes in short the fact that the bus grant signal CSB GRNT received at the timer unit through a tri-state driver 514 is logically linked by means of an AND gate 516 to the bus ready control signal CSB RDY. A further reset condition for the bus rerequest flipflop 512 is derived from an output of an OR gate 518 which links both internal reset conditions of the microprocessing system, the general reset condition RESET generated by the clock generator 500 and a time-out condition of the microprocessor watchdog operation, still to be described in more detail. These different reset signals for the bus request flipflop 512 are logically linked by a NOR gate 520 and applied to the reset input of the flipflop. The inverted output of the flipflop 512 is connected to a further tri-state driver 522 for delivering the bus request signal CSB RQ.

The mentioned bus grant signal CSB GRNT is qualified in a similar manner by a further AND gate 524 logically linking this bus grant signal to an enable signal EN GRNT which is internally provided by the microprocessor system at a time when the microprocessor finishes the system bus cycle. This allows to disconnect the microprocessor from the central system bus even though the bus grant signal CSB GRNT is still active. The output signal of this AND gate 524 is the internally used grant signal GRANT which is active low. This signal above all is used in the bus interface logic to activate the various devices of this logic described in conjunction with FIG. 2.

It has been mentioned that watchdog timers are used in the signaling input/output processor IOP. In fact, there are provided two different watchdog timers, a microprocessor watchdog and a signaling bus controller watchdog.

The microprocessor watchdog is a continuous timer that enables local processing to continue without wait states being inserted in the microprocessor cycles. As described above in conjunction with FIG. 2, time-out counter 104 generates an interrupt request every 3.28 ms. This interrupt request causes the microprocessor 10 to issue a watchdog refresh command. If this command is not issued due to some failure condition within the signaling input/output processor IOP, the corresponding watchdog will expire in approximately 10 ms and hold the ready input of the microprocessor 10 false. At the same time, the bus request flipflop 512 is held false. This allows completion of a central system bus cycle which is in progress, prevents any further such cycles from being requested and suspends all processing on the signaling input/output processor IOP.

The watchdog of the microprocessor system is initially fired by the inverted reset pulse $\overline{RESET}$ which is applied to a retriggerable monostable multivibrator 526. An RC circuit comprising a resistor R1 and a capacitor C1 is connected to external terminals of this multivibrator and is designed in accordance with the manufacturer's specifications to determine a pulse width of 10 ms. The trigger pulse TRIG applied to the high-level-active input of this monostable multivibrator 524 is derived by means of a selector device (not shown) from an internal command bit combination distinguishing a watchdog refresh command from any other command issued by the microprocessor 10. If these trigger pulses are not received at the monostable multivibrator 524 within every 10 ms the watchdog will expire and the first ready input RDY1 of the clock generator is then held false.

The watchdog of the signaling bus controller 26 has a short duration timer of approximately 50 μs. This watchdog is used to detect a failure or error condition within the signaling bus controller 26 only. This watchdog is kept active by logic within the microprocessing unit. A second monostable multivibrator 528 is constructed to provide this watchdog function. An according implementation of an RC circuit comprising a resistor R2 and a capacitor C2 and connected to the external terminals of the multivibrator 528 constitutes this pulse sequence. The multivibrator 528 receives at its low-level-active input an output signal of an inverted OR gate 530 which receives at its both inverted inputs a respective one of the control signals D OUT and FIFO DAT, respectively. Both signals specify one of the conditions of the signaling bus controller 26 when it receives a corresponding command from the microprocessor system, as to be described in more detail.

The second monostable multivibrator 528 has to be retriggered within 50 μs, otherwise the watchdog will expire and a corresponding control signal TIME OUT will be generated at its inverted output. During normal condition of the signaling bus controller 26 this is prevented by a qualified control signal DONE logically linked to the trigger signal CNT TRIG by means of a NAND gate 532. The trigger signal is generated by the time-out counter 104 as shown in FIG. 2. This implementation of the watchdog reflects that the trigger is inhibited when a command to the signaling bus controller 26 is issued, and the watchdog is refreshed only by the controller sequence. If this sequence fails or is intentionally allowed to hang up, as in the case of a bus parity error, the controller watchdog will expire. This will cause a controller time-out interrupt to the microprocessing unit, as described above in conjunction with the priority interrupt controller 102. It should be noted that the expiration of the microprocessor watchdog does not affect the operation of the signaling bus controller 26 and any sequence in progress will run to completion if this occurs. The interface between the microprocessing system and the signaling link bus controller 26 is represented in more detail in FIG. 6. The logic primarily consists of buffers and registers which separate the local bus structure of the microprocessor system and various components that collectively form the signaling link bus controller 26 which is designed to operate on an 8-bit data format. The controller bus interface 22, as schematically shown in FIG. 1, includes a controller status port 220 which buffers a four bit status code of the signaling link bus controller 26 to be accessed by the microprocessor system. Furthermore, two transceiver devices 221 and 222 are arranged to connect the microprocessor data bus 180 to a byte data bus 223. Each transceiver forms a bidirectional connection for either the low byte or the high byte transmitted across the microprocessor data bus 180.

Various other registers are provided which are accessed by input/output port commands on the side of the processing unit, while they are directly controlled by sequencer logic on the side of the signaling bus controller 26. These specific components of this interface include a command-and-data-out port 224. The microprocessor 10 writing to this port initiates one of the sequences of the signaling bus controller. In addition, this port is utilized by the DMA controller 14 to send data during data output. A status-and-data-in port 225 is provided for transmitting information in the opposite direction. The microprocessor 10 reads the status of selected one of the signaling link controllers SLC following a signaling link status command and the DMA controller 14 reads from this port during data input.

A FIFO port 226 is arranged as an interface between a first-in-first-out (FIFO) memory 227 which buffers the statuses of the signaling link controllers SLC associated with the signaling input/output processor IOP as a result of a service scan which will be described later in more detail.

The controller bus interface 22 also includes a buffer register 228 connected to the controller bus 20 and provided for intermediately storing an address of one of the signaling link controllers SLC when checked for its status. This address is either generated by an address counter 229 for a scan operation or directly supplied for scanning an individual signaling link controller SLC. The addressing schemes will be described later in more detail.

The signaling bus interface 24, furthermore, includes conventional 8-bit differential drivers 242 for transmitting commands and data from the controller bus 20 to the signaling link bus 28. A corresponding device comprising 8-bit differential receivers 244 is arranged for transmitting data in the opposite direction. Also included is a conventional parity generator and tester 246 for generating and testing a parity bit which is low when indicating odd parity on all addresses, commands, or data transferred.

Figure 7:
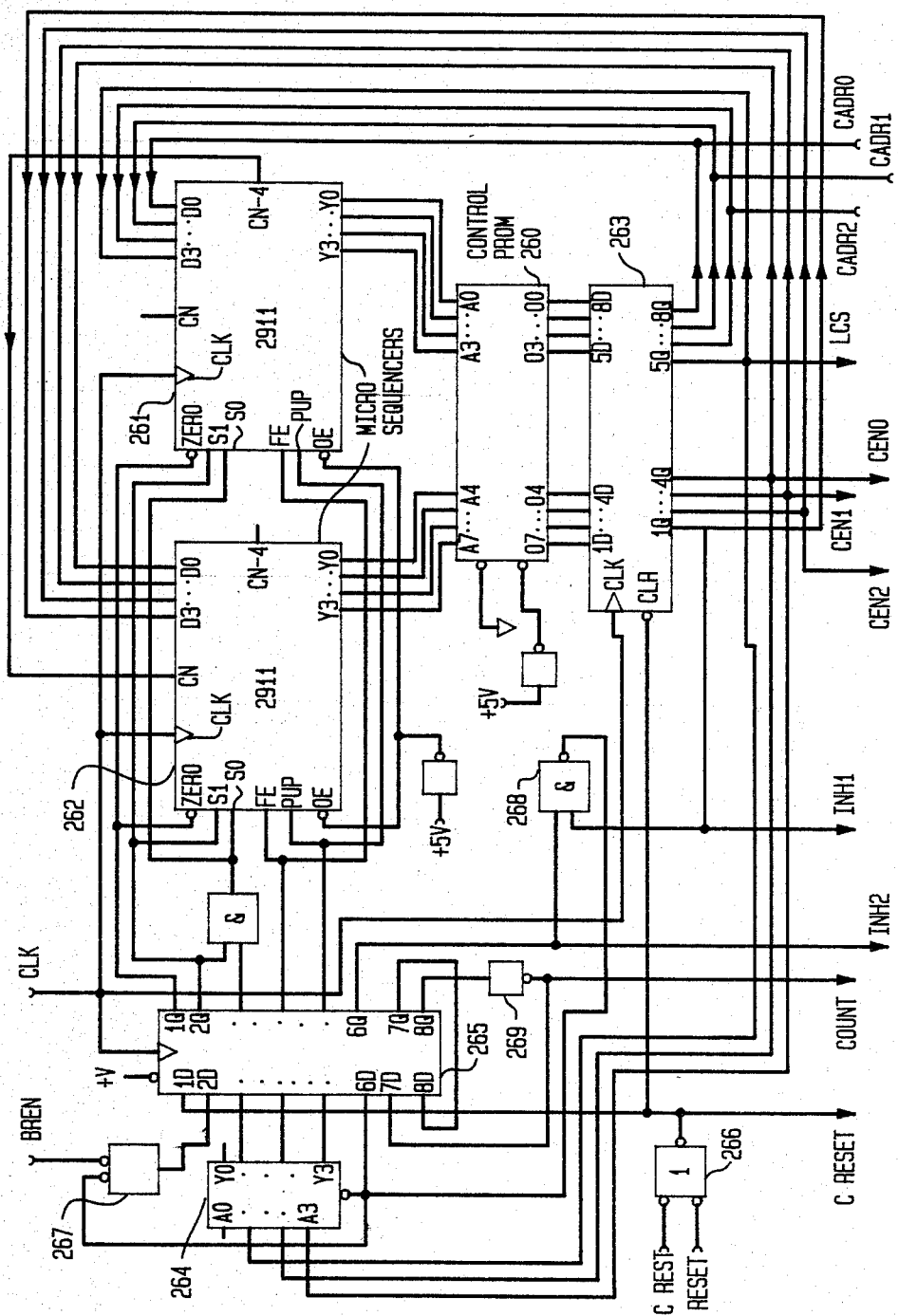
FIG. 7 is a block diagram of a high-speed microprogram-controlled sequencer forming the core of the signaling bus controller.

The signaling bus controller 26 comprises a high speed 8-bit microsequencer with associated control logic described now in more detail in conjunction with FIGS. 7 through 11. The core of the programmable sequencing device represented in FIG. 7 is a programmable read only memory, designated the control PROM 260 and forming a 256×8 bit memory. This memory stores the microprogram of the signaling bus controller and is addressed by two cascaded microsequencers 261 and 262. The microsequencers which are constructed of commercially available integrated circuits 2911 manufactured by Advanced Micro Devices are driven at the same clock rate as the microprocessor system and are capable of executing twelve different operations, nine operations of which are used in this application.

An 8-bit control register 263 is arranged at the output side of the control PROM 260. It contains at any cycle, either the next operation code for the microsequencers 261 and 262 or a branch address to direct the sequencer to something else than the next sequential address. Operation codes fall into two categories, as determined by the condition of the most significant bit.

The first group of operations are control operations specified by operation codes which cause the microsequencers 261 and 262 to perform a continuous operation and at the same time cause the control logic of the signaling bus controller 26 to set or reset one of 16 control levels or to issue one of six control pulses.

Figure 6:
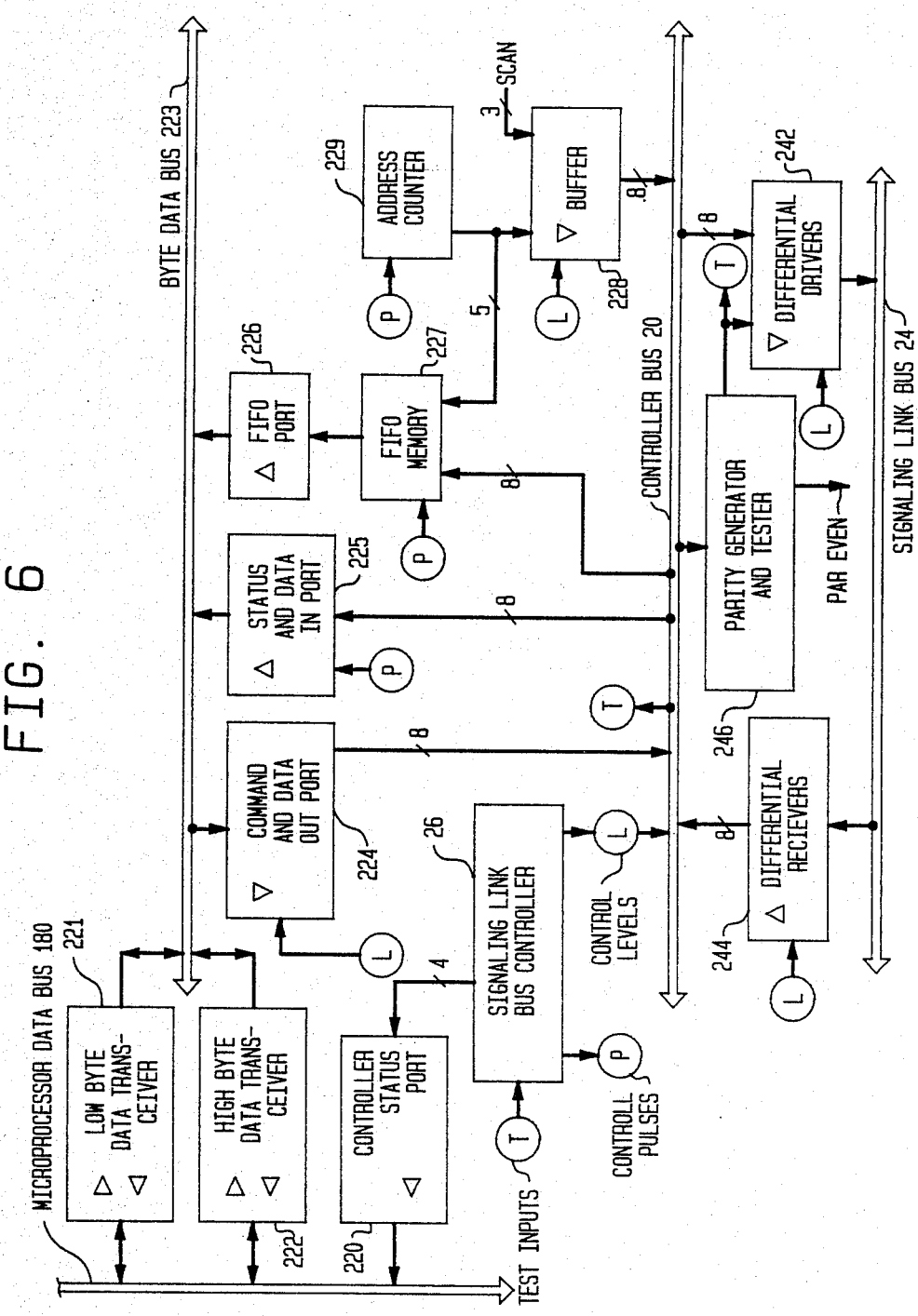
FIG. 6 is a block diagram representing in more detail various interface units controlled by the signaling bus controller and arranged between a microprocessor bus and a signaling link bus which is the connecting link to a plurality of signaling link controllers, each associated with and arranged in a line trunk group of the switching system.

The control levels are schematically indicated in FIG. 6 by the reference symbol L and the control pulses, correspondingly, are designated by reference symbol P. The second group of operations belongs to branch operations designed by operation codes which cause the microsequencers 261 and 262 to perform branch or internal control operations. Some of these operations are conditional upon the status of one of 16 test inputs which are designated in FIG. 6 by the reference symbol T.

Figure 8:
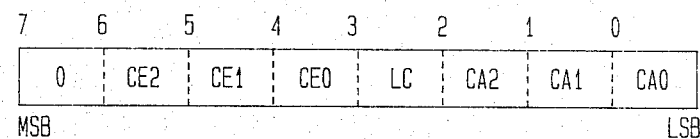
FIG. 8 is a schematic representing the contents of an output control register of the sequencer of FIG. 7 when loaded with data for a control operation.
Figure 9:
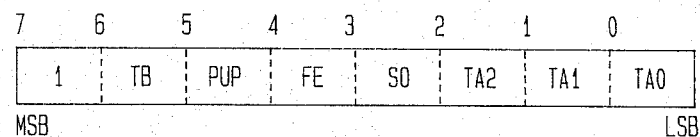
FIG. 9 is a schematic showing the contents of the same register when specifying a branch operation.

The contents of the control register 263 when designating a control operation are shown in FIG. 8 as compared to FIG. 9 which is a schematic representing the contents of this register when specifying a branch operation.

A control operation is distinguished from a branch operation by a "0" stored in bit position 7, the most significant bit position MSB. Bit positions 6 through 4 contain control enable bits CE2, CE1 and CE0, respectively. These three control enable bits determine selectively one out of eight control conditions which enable either a first control level bank (control levels L0 through L7), a second level bank (comprising control levels L8 through L15) or a specific one out of the six control pulses P0 through P5.

The next less significant bit position 3 contains a control level bit LC for setting and resetting, respectively, the addressed control level.

The last three least significant bit positions of the control register 263 determine in combination a control address for selecting one out of the eight control levels of the currently addressed first or second control level bank.

In comparison, FIG. 9 is a schematic which represents the contents of the control register 263 for the first cycle of a branch operation. The most significant bit position correspondingly is set to state "1". The neighboring less significant bit position 6 contains a test bank bit TB enabling either a first test bank comprising test pulses T0 through T7 or a second test bank including the test pulses T8 through T15.

The following less significant bit positions 5 through 3 contain bits designated as PUP, SE, SO, each corresponding to one of respectively referenced control inputs of the microsequencers 261 and 262. The designation follows the manufacturer's instructions and is self-explanatory to those skilled in the art.

The three least significant bit positions TA2 through TA0 of the control register 263 determine, in combination, a test address which selects one out of the eight test signals of the currently selected first or second test bank.

Control operations, as outlined above, are executed in one clock cycle and may be followed immediately by either another control operation or a branch operation. Branch operations, however, require two clock cycles for completion and must contain the branch operation code in the first cycle which is followed by an 8-bit branch address in the second cycle. To minimize the hardware outlay, this second cycle address is required for all branch operations, even for those cases where an address obviously will not be used, such as for push or pop operations to an internal stack. Also to minimize control hardware, all branch operations are defined as unconditional branches, except for direct jumps.

The remaining circuitry of the sequencing device shown in FIG. 7 is designed to provide means for both continuous control operations and branch operations. The outputs of the output control register 263, designated in accordance with reference symbols used in FIG. 8, carry enable signals CEN0 through CEN2, address signals CADR0 through CADR2 and the control level signal LCS. These outputs are connected to respective inputs of the microsequencers 261 and 262 in order to establish the sequencing loop for continuous operation. As far as the branch operations are concerned, there is provided a series connection of a line driver circuit 264 and an octal latch 265 arranged between respective outputs of the output control register 263 and respective control inputs of the microsequencers.

These control inputs are designated in accordance with the manufacturer's specification and further detailed description of the microsequencers as such is not deemed to be necessary after the description of the data format of a branch operation in conjunction with FIG. 9.

It may be mentioned that the first flipflop of the latch circuit 265 is used for buffering a reset condition as generated by a NOR gate 266 which is activated by the general reset control signal RESET, as described above, or a bus controller reset signal CREST. The second D flipflop of the latch circuit buffers a branch enable condition which is accompanied by a branch control signal BREN still to be explained in more detail.

This branch condition is qualified by a further control signal being present in the sixth D-flipflop of the latch 265. The output of this latch is carried to a further NAND gate 268 which is always enabled except for both inputs being high. Since the second input of this NAND gate 268 is connected to the most significant output of the output control register 263, this double high condition occurs whenever the first word of the branch operation is stored in this output control register. At this time, the NAND gate 268 furnishes an output signal which activates an inverted AND gate 267 for supplying a qualified branch enable signal, as outlined above.

At the same time, a first inhibit signal INH1 is issued by the microsequencing device. In addition, the line driver circuit 264 is enabled to drive the corresponding connected D-flipflops of the latch circuit 265 in accordance with the respective output signals of the output control register 263.

The last two D-flipflops of the latch circuit 265 are connected in a loop including an inverter 269. By means of this loop, the count signal COUNT is generated which advances the time-out counter 104 described in conjunction with the block diagram of FIG. 2.

The entire circuitry of the sequencing device is controlled by a clock pulse train represented by the clock signal CLK described hereinbefore and applied to the microsequencers 261, 262, the output control register 263 and the latch circuit 265 in parallel.

Figure 10:
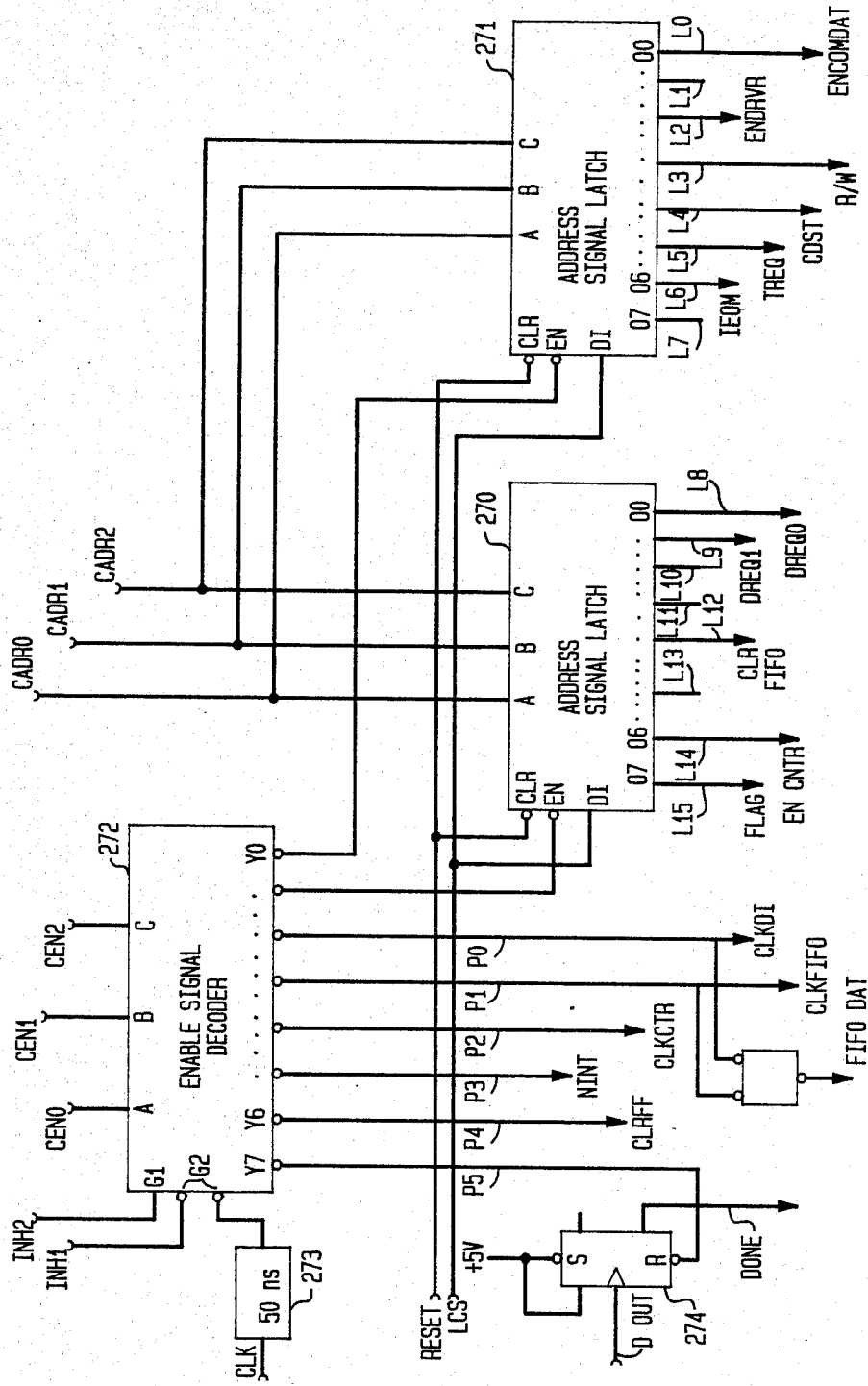
FIG. 10 is a block diagram representing parts of the interface logic of the signaling bus controller provided for generating control signals associated with control operations.

The interface logic of the signaling bus controller 26 associated with control operations is represented in FIG. 10. This interface logic comprises two addressable latch circuits 270 and 271 which are connected to receive the address signals CADR0 through CADR2 at respective ones of address inputs A, B, C. These control address signals forming output signals of the output control register 263, as shown in FIG. 7, correspond to the control address bits CA0, CA1 and CA2, respectively represented in the schematic of FIG. 8.

Furthermore, there is provided a 3-to-8 decoder circuit 272 connected to receive control enable signals CEN0 through CEN2 from respective outputs of the control register 263. These signals correspond to the control enable bits of the register contents. This enable signal decoder 272 has a first select input G1 and a pair of further select inputs G2. One of these second select inputs G2 receives the microprocessor clock signal CLK delayed by a 50 ns delay line 273 which allows the levels to become settled prior to interrogation. The further select input of this pair of select inputs G2 receives the first inhibit signal INH1. This inhibit signal corresponds to the most significant bit position of the control register 263. As described in conjunction with FIG. 7, the status of this bit position is always low if the contents of the control register 263 designates a control operation. Both select signals received at the select input G2 are logically linked by an internally arranged AND gate (not shown) and have to be low for activating the enable signal decoder 272.

In contrast, the select signal INH2 which is generated as shown in FIG. 7 and is received at the first select input G1 has to be high. This is achieved by means of the NAND gate 268 provided in the microsequencing circuit in combination with a respective one of the D-flipflops of the octal flipflop circuit 265. The first inhibit signal INH1 is directly furnished to one of the inputs of the NAND gates 268 and its output is connected to one input of the octal D flipflop circuit 265. The respective Q output of this flipflop is connected to the second input of the NAND gate 268 and furnishes the second inhibit signal INH2. The function of the combination of these two inhibit signals is such that the enable signal decoder 272 is always pre-set to be activated by a clock signal as long as the control register 263 does not contain information concerning a branch operation.

The outputs of the enable signal decoder 272 include two least significant outputs which are connected to a respective one of enable inputs of the address signal latches 270 and 271, respectively, thus providing the means for selecting one of the level banks described above. The address signal latches are reset by the reset signal RESET applied to their respective clear inputs which signal is generated when a reset condition of the microprocessor system occurs.

Both data inputs of the address signal latches 270, 271 receive the output signal LCS of the control register 263 which corresponds to the level control bit LC described above. This signal sets or resets depending on its status the respective stage of one of the address signal latches whenever a change of the control level is specified by the operational code of the control operation.

The different control operations and the corresponding control levels L0 through L15 will be summarized in the following. Each control operation is specified by a respective instruction stored in the control PROM 260. Two instructions concern setting or resetting of control level L0. This control level is furnished to the command-and-data-out port 224 for enabling and disenabling, respectively, the command data register forming a part of this port. As indicated in FIG. 10, the control level L1 is not connected and can, therefore, be used for programming a "no operation".

Two further instructions concern setting and resetting, respectively, of the control level L2 which is furnished to the differential drivers 242 associated with the signaling link bus 24 to enable and disenable, respectively, these drivers. Correspondingly, two further instructions are provided for setting and resetting, respectively, the control level L3 carried to the differential receivers 246.

Two further instructions are provided for setting and resetting of control level L4 which controls the setting and resetting, respectively, of a command data strobe CDST transmitted across the signaling link bus 28 to the signaling link controllers SLC.

A corresponding pair of further instructions concern the setting and resetting of control level L5 controlling the setting and resetting, respectively, of a corresponding transfer request TREQ sent to the signaling link controllers SLC.

Another pair of instructions is associated with control level L6 which is used for setting and resetting, respectively, an end of message signal IEOM also supplied to the signaling link controllers SLC. As to be seen from FIG. 9, control level L7 is not used.

The next two control levels L8 and L9, control the setting and resetting of DMA requests DREQ0 or DREQ1, which concern requests for a respective one of the channels of the DMA controller. The control levels L10, L11 and L13 are not used.

The remaining three control levels L12, L14 and L15 and the respective setting and resetting instructions concern internal operations within the signaling link controller 26. The control level L12 is used to clear the internal FIFO memory 227. The control level L14 enables or disenables the address counter 229 and the control level L15 sets or resets a program flag signal FLAG, which will be explained later in more detail.

The enable signal decoder 272 controls the enabling of either one of the two address signal latches 270, 271 by means of its two least significant output signals and, in addition, generates the six control pulses. Each of these pulses, P0 through P5, is furnished at a corresponding one of the more significant outputs of the enable signal decoder 272 when specified by a respective bit combination of the control enable bits CE0 through CE2 and, in turn, the corresponding control enables signals CEN0 through CEN2. These control pulses are generated, in the same manner as the control levels during the execution of a corresponding control operation specified by a respective control command.

A control pulse P0 is generated for enabling data to be written into the status-and-data-in port 225. A control pulse P1 in combination with pulse P0 activates the internal FIFO memory 227 for a write operation by means of the control signal FIFO DAT. The address counter 229 is incremented by control pulse P2, and control pulse P3 initiates the request for a normal interrupt NINT to the interrupt controller 102 of the microprocessor system. The two control pulses P4 and P5 provide clear signals to the parity bit generating and testing device 246 and a command flipflop 274, respectively. The command flipflop 274 alerts the signaling bus controller 26 of a command stored in the command-and-byte-out port 224.

The main further characteristic of the signaling bus controller 26 is to check on the statuses of the various sequencer test inputs. These test inputs T0 through T15 are checked by the signaling bus controller 26 under program control in order to provide for conditional branch operations. The contents of the output control register 263 concerning branch operations have been described above in conjunction with FIG. 9. The interface logic for selecting a test is now represented in FIG. 11. This circuitry is composed of two 8 bit selectors, each having eight data inputs connected to a respective on of the test inputs T0 through T15 utilized in the signaling bus controller 26. This arrangement again allows for establishing of two test signal banks comprising test input signals T0 through T7 and T8 through T15, respectively. The test interface logic comprises two selector devices 275 and 276, respectively, each associated with one bank of the test levels. The test levels T0 through T7 are received at a corresponding one of the data inputs of the first test signal selector 275 and, correspondingly, the test signals of the second bank are carried to a respective one of the data inputs of the second test signal selector 276.

In accordance with the format of an instruction concerning a branch operation currently present in the control register 263, the second most bit position contains the test bank, selecting bit TB. The corresponding signal occurs at the control output line CEN2 of the control register 263 and is carried to the test signal interface logic. The corresponding input of the test signal interface logic is directly connected to a selector input of the first test signal selector 275 and across an inverter 277 to the corresponding input of the second test signal selector 276. Accordingly, depending on the state of the test signal bank selecting bit TB, just one of the test signal selectors 275 and 276 will be selectively activated. Each of the test signal selectors, furthermore, is provided with three address inputs A, B, C, which are connected to a respective one of the address signal outputs CADR0 through CADR2 of the control register 263 for providing the address information necessary for selecting one out of the eight test signals associated with the selectors. The corresponding ones of the selector outputs Y2 of both test signal selectors 275 and 276 are commonly connected to produce an active branch enable signal BREN, if the selected test signal is positive. These test signals, in combination with the corresponding conditional branch instructions will be summarized in the following. The branch operations which include the interrogation of a test signal are basically conditional branch operations which need two microprogram cycles in order to process the two bytes of a branch instruction, wherein the first byte shows the format as represented in FIG. 8, and the second byte specifies the address of the control PROM 260 where the sequencer microprogram is to be continued, if the test is true.

The status of the command flipflop 274 is checked by means of the first test T0; the test is true, if this flipflop is not set. The tests T1 through T3 interrogate the status of a respective one of the controller data bits CDAT5, CDAT6 or CDAT7. The bit combination of these bits determines the type of sequence to be initiated by the sequencer arrangement as will become more apparent later. Test T5 checks the status of a transfer acknowledgement signal TACK. By test T6 an end-of-message condition is evaluated by interrogating a respective end-of-message signal SEOM. The test T6 is a test of correct transfer of a data byte and results in a jump if a respective parity error flipflop arranged in the parity generating and testing device 246 (FIG. 6) is set.

The following tests refer to DMA transfers. Test T7 refers to a check of the condition of a DMA transfer and results in a jump if a respective flipflop indicating the end of DMA transfer process is set. The tests T8 and T9 evaluate the progress of the handshaking procedure in view of a respective one of the two utilized DMA channels and result in a jump, if an acknowledgement signal DACK of the respective channel is true. By means of test T10 the progress of a scan operation is checked in such a manner that the address counter state is interrogated. Tests T11 and T12 are not used and test T13 results in a jump, if the controller firmware flag HFLAG is set. As to be seen from FIG. 11, tests T14 and T15 are special inasmuch that test input T14 is pulled up to positive voltage and always causes a branch. On the other hand, test input T15 is grounded and, therefore, never results in a branch operation. These two tests, in fact, are unconditional branch operations. The same condition applies to a branch operation designated as the "NO" operation. In contrast, there are defined some indirect jump operations which control jumps to an address given in the second byte of the instruction. These jumps may be accompanied by a pop or push of the stack and apparently require a second sequence cycle for execution. It may be recognized that all branch operations are performed as two cycle operations for the sake of the simplicity of the hardware, even if the address given by the second byte is meaningless as is the case with an unconditional branch operation.

Having described the main hardware of the signaling bus controller 26 and having given an appropriate introduction into the firmware structure, those skilled in the art will be able to comprehend the supporting firmware of the signaling bus controller 26 represented in Appendixes A through D, which appear at the end of this description of a preferred embodiment.

Appendix A lists the definitions of the described control and test signals of the signaling bus controller. It is meant for use as a convenient reference and no further description is deemed necessary.

Appendix B is a listing of the instruction set established for the sequencing arrangement of the signaling bus controller 26.

These instructions define the control operations, the unconditional branch operations and conditional branch operations described herein before.

This listing of the instructions, including an outlined functional characteristic, will be most helpful for a better comprehension of Appendix C which represents the firmware program of the signaling bus controller 26. In the following description of this program, reference is made to the location numbers for identifying the different program routines or sequences.

The sequencer arrangement of the signaling bus controller 26 is always forced to a condition corresponding to a location 00 of the sequencer firmware during a power-up reset pulse or during the execution of a reset command issued by the central system bus CSB. An initialization sequence starts at this location in order to establish the initial conditions required within the signaling bus controller 26. This sequence is labeled "START" and forces the sequence to enter an idle loop at location 10, where the state of command flipflop is repeatedly tested for receipt of new command.

Once a new command is received, the sequencer will clear status flipflops and will perform test branches before entering the correct command sequence. This command decode sequence starts with location 18 and may run through location 28 and includes the sequence represented in locations 3C through 3F. This command decoding leads to eight possible sequences which are correspondingly labeled in the listing of the firmware program. All these sequences will terminate in one of two ways: (1) the sequence will complete normally and a termination sequence is performed or (2) the sequence will enter a forced idle loop due to an error condition and wait there for the sequencer time-out and the subsequent RESET from the processing unit. This second condition always is performed by an unconditional jump to code FE.

The possible sequences will be described briefly in the following order of the firmware program shown in Appendix C.

The sequence covering locations 29 through 3B refers to a scan sequence of the FIFO memory 227. A decoded scan command for this memory immediately disconnects the command byte from the internal controller bus and connects the buffered output of the address counter 229 and a 3-bit command code indicated as input information of the buffered 228 (in FIG. 6). The output counter is initialized to count zero and the subsequent command strobe requests a status byte from the first one of the signaling link controllers SLC residing on the signaling link bus 28. Then, the utilized bus direction is reversed, and after a short delay for stabilizing the status, a control pulse is issued in order to clock the input of the FIFO memory 227. This pulse is combined with controller logic and will only reach the memory if specific conditions are met. If these conditions are satisfied, the address of the currently selected signaling link controller SLC will be loaded into the FIFO memory 227 and accordingly, the status information received from the selected signaling link controller SLC, would be written into the selected memory location. The counter is then advanced and the outlined steps are repeated. After each scan operation, the counter output is tested for maximum count in order to determine a complete scan cycle. If this cycle is complete, a pulse is issued to the priority interrupt controller 102 (shown in FIG. 2). If not complete, the sequence is repeated until status has been received from all possible addresses of the signaling link controllers SLC.

In locations 42 through 61 of the firmware program, a data-out sequence is listed which is specified by a data-out command. This sequence issues a normal command strobe and then calls a short subroutine to obtain data from the microprocessor RAM 162 by use of the DMA controller 14 (shown in FIG. 2). One byte of data is obtained by this subroutine and a sequencer control flag HFLAG is used to identify the last byte of this message. If the current byte is not the last byte, the sequencer of the signaling bus controller 26 raises the transfer request HTREQ to the signaling link controller SLC in order to latch the data at this controller, and calls the subroutine to fetch the next data byte. This procedure continues until the signaling bus controller 26 receives the final byte. At this time, the subroutine is not called and the end-of-message signal HIEOM is sent. Upon completion of this last handshake, an interrupt request is generated.

It should be noted that the selected signaling link controller SLC checks parity during each byte transfer and withholds the acknowledgement signal HTACK, if an error is detected. This causes the signaling bus controller 26 to wait indefinitely until time-out occurs.

Locations 72 through 9B of the firmware program cover a sequence for data transfers in opposite direction which are initiated by a data-in command. A normal command strobe to the addressed signaling link controller SLC is issued and the bus direction is reversed thereafter in order to prepare for incoming data. The first byte of data is requested by the transfer request signal HTREQ and the sequencer arrangement waits for acknowledgement by the signaling link controller SLC in form of the acknowledgement signal HTACK. When received, the sequencer arrangement tests for the end-of-message signal HSEOM, clocks the data into the data register, and checks for a parity error prior to dropping the transfer request. It then waits for the completed handshake by testing a transfer acknowledge line-to be described-from the signaling link controller.

This procedure is consistent throughout all sequence handshakes and insures that control lines have returned to their inactive state. If a parity error is detected, the sequencer arrangement will idle indefinitely until a timeout occurs. If the end-of-message indication is received, the flag control level HFLAG is cleared. The flag is then tested to determine if the data just received was the final byte of the message. If not, another request is issued and while this is being processed by the signaling link controller SLC, the previous byte is stored into the RAM 162 of the microprocessor system.

This is accomplished by the DMA controller 14 that has been programmed by the firmware prior to issuing the command to the signaling bus controller 26. After the DMA controller 14 has acknowledged transfer of the data to the memory, the sequencing arrangement repeats this process by receiving the next byte of the message. This continues until the last byte is received. At this time no further requests are made to the selected signaling link controller SLC, the last byte is transferred to the memory and an interrupt pulse is issued to the priority interrupt controller 102.

The following sequences listed in the firmware program are several test sequences. Locations A0–B0 refer to an internal diagnostic sequence with reference to DMA transfers. The corresponding initiating DMA test command specifies one of these two internal diagnostics for the logic of the signaling bus controller 26. This command does not affect the control lines of the signaling input/output processor IOP and the signaling link controllers SLC. The sequence requests one byte of data from the output channel of the DMA controller 14, passes it to the status-and-data-in port 225 and then stores it back to the RAM 162 via the input channel of the DMA controller 14. This operation repeats until the last byte has been received from the output channel.

When this byte is transferred back to memory, the respective interrupt pulse is issued to the priority interrupt controller 102, and the sequencer arrangement returns to the idle loop, i.e., it waits for the next command.

The second internal diagnostic sequence is initiated by a FIFO test command and correspondingly has no affect on the control lines outlined above. This test sequence is contained in locations B1 through BE of the firmware program. The listing shows that a series of status commands for the signaling link controllers SLC are generated similarly to the previously described FIFO scan sequence. But in this case, command strobes are not issued and status is not received; instead, the FIFO memory 227 is pulsed when the address command bytes are present on the internal controller data bus 20. This repeats until the maximum address count is reached and an interrupt request is generated.

The sequence listed at locations D0 through DE of the firmware program specifically refers to the DMA read sequence already outlined above in connection with the DMA transfer routine.

The next following sequence listed at locations E0–EA is a sequence which can be initiated by a signaling link controller status command. This command generates a normal command strobe to the addressed signaling link controller SLC and then reverses the direction of the connecting bus. This causes the connected signaling link controller SLC to place a status byte on the bus which byte is pulsed into the status-and-data-in port 225 after one cycle of delay. The sequencer arrangement then branches to a termination routine without requesting an interrupt.

For system reliability, the signaling input/output processor IOP and the signaling link bus may be provided in a redundant manner. Whereby, one system is master and the other system operates in a stand-by mode. For this reason there is established the bus master command. By means of this command the bus, over which the command is issued, is the currently selected master bus. In order to inform the signaling link controllers, this command initiates a sequence which is identical to the status sequence just described. The addressed signaling link controller SLC will be accordingly set and this can be verified by examining the status byte that is returned.

The last sequence of the firmware program covering locations F0 through F8 is a master clear sequence initiated by a master clear command for the signaling link controller SLC. This sequence generates a longer than normal command strobe to the addressed signaling link controller module. It then branches immediately to a termination sequence without requesting an interrupt. This termination sequence is listed at locations 11–17 of the firmware program and results in a return to the idle loop condition of the sequencer arrangement.

Having described the firmware module of the signaling input/output processor IOP, a more detailed understanding of the operation of the signaling bus controller 26 and the thereby achieved communication with the signaling link controllers SLC may be had from the following description where reference is made again to FIG. 6.

During normal operation, the signaling bus controller 26 receives command bytes from the microprocessing unit which are buffered in the command-and-byte-out port 224. The contents of the respective command register are represented in the diagram shown in FIG. 12.

The least significant bits, D0 through D4, determine in combination a 5 bit address of a specific one of the signaling link controllers SLC. The three most significant bits determine the type of command issued. These eight possible commands have been outlined above and are listed below in Table 3 in conjunction with the respective command codes.

TABLE 3

| COMMAND BITS | | | | |
|---|---|---|---|---|
| D7 | D6 | D5 | TYPE | COMMAND |
| 0 | 0 | 0 | TIMED | MASTER CLEAR |
| 0 | 0 | 1 | TIMED | STATUS |
| 0 | 1 | 0 | INTERR. | FIFO SCAN |
| 0 | 1 | 0 | TIMED | SET BUS MASTER |
| 1 | 0 | 0 | INTERR. | DATA IN |
| 1 | 0 | 1 | INTERR. | DATA OUT |
| 1 | 1 | 0 | INTERR. | FIFO TEST |
| 1 | 1 | 1 | INTERR. | DMA TEST |

Figures 11, 12, 13, 14:
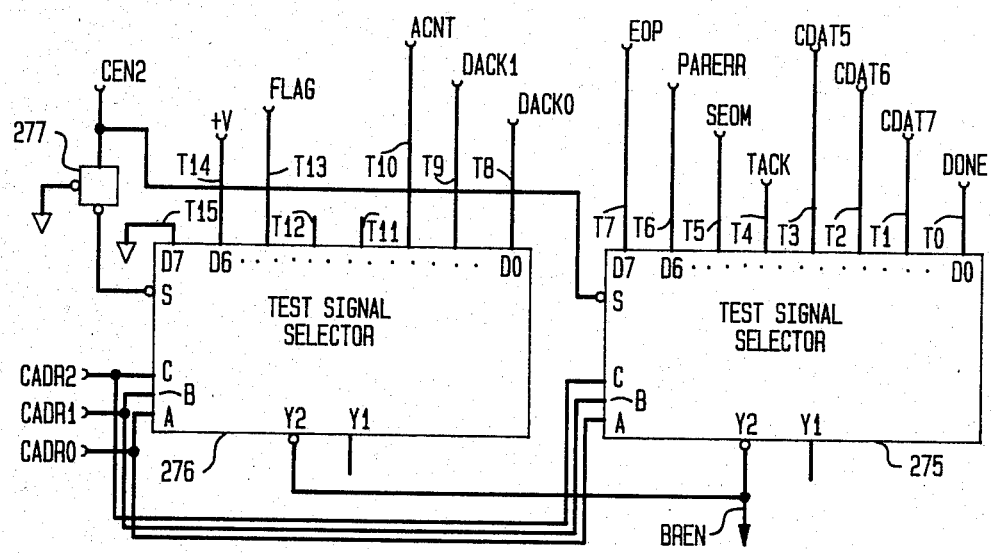
FIG. 11 is a block diagram representing a section of the interface logic of the signaling bus controller designed for interrogating various test conditions and for generating corresponding test processes.
FIG. 12 is a schematic representing the format and structure of a command register being arranged in a command-and-byte-out port which is one of the interface units shown in FIG. 6.
FIG. 13 is a schematic representing the format of a status register constructed in a status-and-data-in port forming another one of these interface units, wherein this register represents the status of a currently selected signaling link controller.
FIG. 14 is a schematic representing the format of a FIFO port associated with a FIFO memory of the sequencer which port is utilized for buffering signaling link controller status during a scan operation.

The status information received from a selected signaling link controller SLC will be evaluated by means of the byte buffered in the status-and-data-in port 225. The format of the status byte is represented in the diagram of FIG. 13. Bit D0 indicates, if set, that the selected signaling link controller SLC has a message for the signaling input/output processor IOP and is ready to transmit it. The next two bits D1 and D2 indicate, if set, that the buffers associated with the serial channels 1 and 2 are ready to accept messages. Correspondingly, the respective bits are reset to indicate that the buffer is full or the DMA controller 14 is not ready for transfers. The bit of position D3 being high indicates a status of the respective signaling link controller SLC in which status it is ready to accept a diagnostic message. The next bit D4 is established for a redundant system and indicates that the connecting signaling link bus 24 currently is master, if the bit is set. Bit position D5 is related to a watchdog function and specifies, if high, that the watchdog of the connected signaling link controller SLC has expired. Bit position D6 is always zero and the most significant bit position D7 represents an active low signal to indicate that the board associated with the selected signaling link controller is present. On the other hand, this bit is set, if this board is not present or the issued command was rejected. If this most significant bit D7 is set, all bytes D0 through D6, representing the status of the selected signaling link controller SLC, are undefined.

The status register arranged in the status-and-data-in port 225 buffers the status of an individually selected signaling link controller SLC. It was mentioned that the statuses of all available signaling link controllers can be obtained by means of a scan operation. The corresponding input port which buffers such statuses during a FIFO scan operation is the FIFO port 226. One or more status bytes are available at this port if the signaling bus controller status indicates that this port is ready. One status byte at a time is read from this port until the respective status bit in the controller status port, still to be described, is false.

The format of a status byte of the FIFO port 226 is represented in the diagram of FIG. 14. The five least significant bits D0 through D4 define the address of a signaling link controller SLC that is requesting service or did not respond correctly. Status bit D5 is a service request bit which indicates, if set, that the signaling link controller SLC determined by the address contained in the previously mentioned address bits has a message for the signaling input/output processor IOP and is ready to transmit. The status bit D6 represents the watchdog condition of the corresponding signal link controller SLC and indicates, if set, that this watchdog timer has expired. The most significant status bit D7 is an error bit which is set to indicate that a parity error occurred during the transfer of status from the addressed signaling link controller SLC.

The set condition of this error bit of the FIFO status byte does not cause an error interrupt upon the completion of the FIFO scan command. On the contrary, an error interrupt which corresponds to a controller time-out condition following a scan command indicates that the scan command did not terminate normally and that the sequencing bus controller watchdog has expired.

Figure 15:
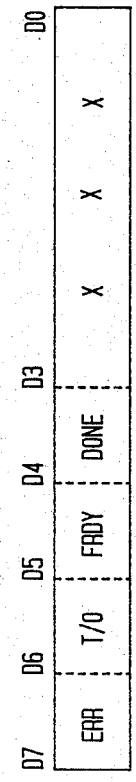
FIG. 15 is a schematic representing the format of a controller status port which forms another one of the interface units to the microprocessor system as shown in FIG. 6.

Finally, the controller status port 220 will be described in conjunction with FIG. 15 representing its format structure. The four most significant status bits of this port are of major concern, and the less significant bits D0 through D3 are represented by "X" accordingly. The least significant one of these status bits is set upon completion of every command. It is cleared whenever a command is initiated. This status bit is designated as status bit "DONE" and it may be noted that previously the corresponding control signal "DONE" has been mentioned in conjunction with the watchdog characteristic of the signaling link controller 26. Another one of these controller status bits is a status bit "FIFO OUTPUT READY" which was referred to above. If this bit is set, it indicates that the address of a signaling link controller SLC is in the FIFO memory 227. The two further status bits refer to a time-out condition and an error condition, respectively. The status bit "Time-Out" specifies, if set, a controller sequence error. In this case, the bus controller has malfunctioned or has been intentionally stopped because of a bus transfer error and the controller watchdog has expired. This status bit requires a bus reset command to clear. The status bit "ERROR", if set, indicates that a parity error occurred during a transfer of status or data from a signaling link controller to the signaling input/output processor IOP. If this condition occurs after a FIFO scan command, it indicates that one or more parity error bits are set in the FIFO status bytes.

Figure 17:
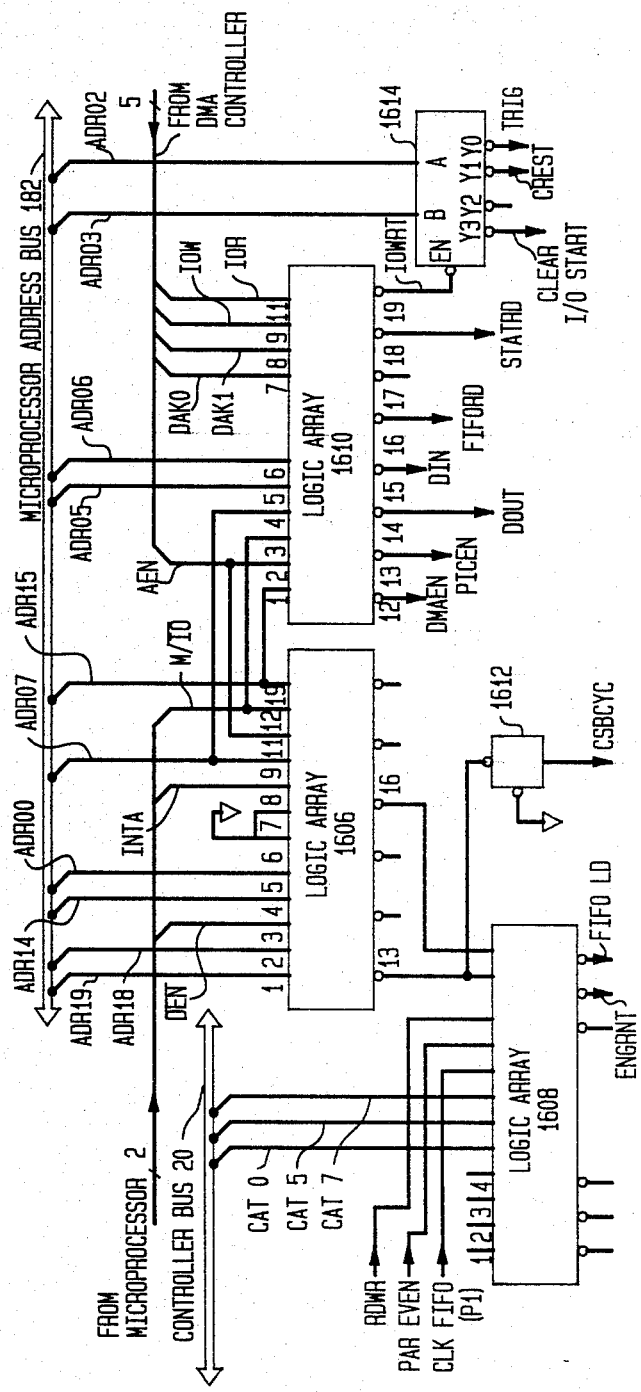
FIG. 17 is a block diagram showing logic circuits implemented in form of programmable logic arrays designed to furnish select control signals of various devices of the signaling input/output processor.
Figure 16:
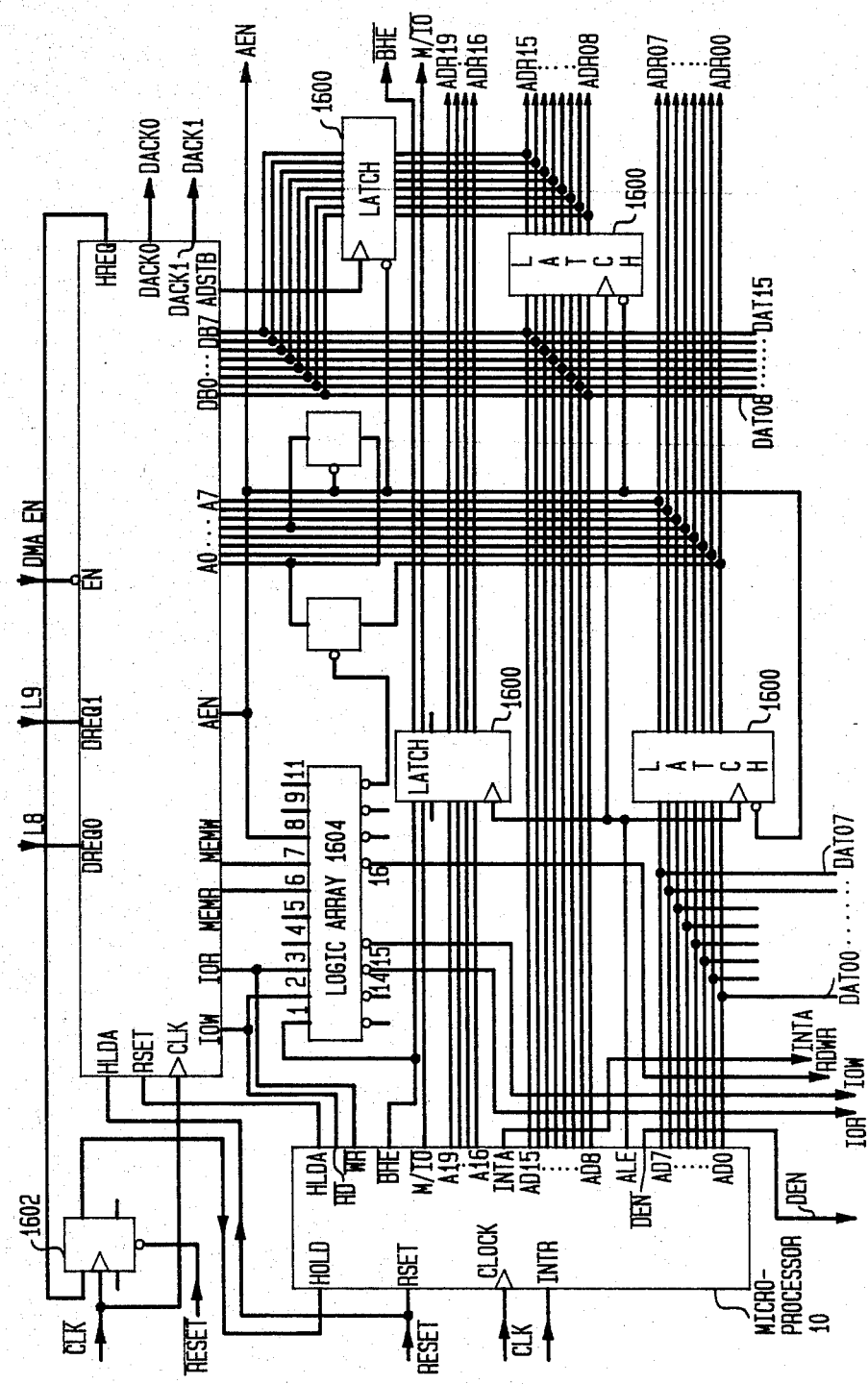
FIG. 16 is a block diagram representing the microprocessor and the DMA controller connected to establish the microprocessor bus, and including additional logic circuitry.

Various control signals have been mentioned herein before which signals, above all, enable the different devices of the microprocessor system and of the sequencing controller. FIGS. 16 and 17 represent block diagrams showing the respective logic circuitry for producing such control signals.

FIG. 16 is a block diagram showing the structure of the microprocessor bus 18 and the microprocessor 10 and the DMA controller 14 connected thereto. Both control devices receive timing signals CLK and a reset signal RESET furnished by the clock generator 500 as described in conjunction with FIG. 5. An interrupt request signal INTRQ is supplied to the interrupt input of the microprocessor 10, this signal is generated by the priority interrupt controller 102 as described in conjunction with FIG. 2. The DMA controller 14 receives request signals DREQ0 and DREQ1 for a DMA transfer which signals are identical with the control levels L8 and L9, respectively, as described in conjunction with FIG. 10. The DMA controller 14, in addition, receives an enable signal DMA EN which will be described in more detail in conjunction with the circuitry shown in FIG. 17. Upon receipt of a request, the DMA controller 14 itself requests to hold control of the microprocessor bus 18 by means of the output signal of a further control flipflop 1602 being arranged to receive the corresponding request of the DMA controller 14 and to furnish a hold signal to the microprocessor 10. The flipflop is timed by the same inverted clock pulse train $\overline{CLK}$ which is also received by the DMA controller 14. The hold signal is acknowledged to the DMA controller by a respective acknowledgement signal HLDA, whereupon the DMA controller 14 is bus master for a cycle.

The remaining parts of the diagram of FIG. 16 represent basically the microprocessor system bus including various latches 1600; data lines DAT00 through DAT15 and address lines ADR00 through ADR19. This bus structure is quite conventional for a microprocessor system composed of a microprocessor and a DMA controller, a very detailed description is therefore deemed not to be necessary. It may be just mentioned that each of the latches 1600 are enabled and blocked, respectively, by corresponding output signals ALE and AEN of the microprocessor 10 and the DMA controller 14, respectively.

In addition, the microprocessor 10 supplies a data enable signal $\overline{DEN}$ which is active low during each memory and input/output access and also for interrupt acknowledgement cycles. Furthermore, the microprocessor 10 and the DMA controller 14 furnish a group of status control signals. A read strobe $\overline{RD}$ indicates that the processor is performing a memory or input/output read cycle. A lock output furnishes a 3-state signal $\overline{WR}$ which is active low and indicates that the DMA controller 14 is not to gain control of the microprocessor system bus 18. As indicated herein before, the data byte enable signal $\overline{BHE}$ is also a 3-state signal which is low for read, write and interrupt acknowledgement cycles when a byte is to be transferred on the high portion of the bus. A further 3-state output supplies the control signal M/IO which is used to distinguish a memory access from an input/output access.

The corresponding status signals of the DMA controller 14 include two 3-state signals IOR and IOW, respectively. The control signal IOR is a bi-directional active low signal used by the microprocessor to read the control registers; in the active cycle of the DMA controller it is an output control signal used to access data from a peripheral during a DMA write transfer. The second control signal IOW is a corresponding 3-state signal utilized either to load information into the DMA controller 14 or generated by the DMA controller 14 to load data to a peripheral during a DMA read transfer.

Two further 3-state signals concern the control of memory access. The memory read signal MEMR is active low and allows for accessing data from a selected memory location during a DMA read cycle. The corresponding memory write signal MEMW controls writing of data into a selected memory location. As mentioned previously, just two channels of the DMA controller 14 are utilized in this application and correspondingly two acknowledgment signals DACK0 and DACK1, respectively, are used to notify an individual peripheral when it has been granted a DMA cycle.

These different status signals of the microprocessor 10 and the DMA controller 14 are furnished to respective inputs of a first logic array 1604 which is a programmable 10 input-and/or logic array. Such a device is manufactured by Monolithic Memories, Inc., as its circuit PAL 10 L8. This logic array allows for a compact logic circuitry replacing conventional TTL logic circuitry. There are three output signals IOR, IOW and RDWR of this logic array 1604 which are here of main concern. The operation of the logic array 1604 regarding these three signals can best be described by means of logic equations; for eliminating any confusion, a common notation will be used for describing logic operations of this and corresponding arrays to be described below which notation is based upon the represented pin numbers rather than signals themselves. In addition, it may be noted that a logic and function is designated by "*", an OR-function is designated by "+" and the inversion of an input signal is designated by "/" in front of the respective pin number. Having this in mind, the following equations (1), (2), (3) regarding the control signals IOR, IOW and RDWR, respectively, which are active low, should be self-explanatory in light of the previous description $$14 = /1*/3*/8 + /3*8 \tag{1}$$

$$15 = /1*/2*/8 + /2*8 \tag{2}$$

$$16 = /3*/8 + /2*/8 \tag{3}$$

FIG. 17 shows the remaining logic circuitry including three further logic arrays 1606, 1608 and 1610, respectively. These three logic arrays are connected to receive address signals from the microprocessor address bus 182, the described status control signals from the microprocessor 10 and the DMA controller 14, respectively, and two further control signals PAR EVEN and CLK FIFO. The former of these two control signals is an output signal of the parity generating and testing device 246 and indicates bad parity; the latter control pulse signal is identical with the described control pulse P1.

One of these logic arrays is a decoder array 1606 receiving at its inputs several ones of the address signals, the control signals $\overline{DEN}$ and $\overline{M/IO}$ from the microprocessor 10 and the enable control signal AEN from the DMA controller 14. This decoder array can be implemented by the programmable array logic circuit, PAL 12 L6 manufactured by Monolithic Memories, Inc. It generates enable signals, as for example, the enable signal for the RAM MEMORY 162 described in conjunction with FIG. 2. This enable signal EN RAM is furnished at output 16 based upon logic operations on respective input signals as specified in the following equation:

$$16 = 12 + /1*/2*11*/12*19 \tag{4}$$

The second control signal which is here of interest is supplied at output 13 of this decoder array 1606. It is the inverted form of the control signal CSB CYC generated in accordance with the logic equation:

$$13 = 8*/11*/12*19 + 1*/2*8*11*/12 + 1*2*8*11*/12 \tag{5}$$

The control signal CSB CYC is furnished to an inverter 1612 which provides for the active low state of this signal in which state it is one of the main control signals of the microprocessor system indicating an active central system bus cycle and for example, is utilized as one input signal of the microprocessor watchdog, previously described in conjunction with FIG. 5. These two output signals of the decoder array 1606 are connected to respective inputs of a further logic array, the control logic array 1608, which is implemented by a PAL 12 L6 device of Monolithic Memories, Inc. It furthermore receives the previously mentioned control signals and selected bit signals of a sequencing controller data byte, previously described in conjunction with FIG. 13, for example. The logical operation of the control array 1608 is apparent from the two following logic equations:

$$17 = /11*/12 \tag{6}$$

$$18 = 5*/7*8 + 6*/7*/8 + 7*/8*9, \tag{7}$$

which describe derivation of the enabling signal EN GRNT and the load control signal FIFO LD, respectively. The enabling signal EN GRNT is utilized to control generating of the grant signal GRANT as previously described in conjunction with FIG. 5 and the load control signal FIFO LD enables the FIFO memory 227 of the sequencing controller to load the data byte currently on the controller bus 20.

The third logic array represented in FIG. 17 again is a programmable array logic device PAL 10 L8 manufactured by Monolithic Memories, Inc., and is designated an enable input/output controller array. It receives the address signals ADR05 and ADR06 from the microprocessor address bus 182 and various ones of the control signals described herein before in conjunction with FIG. 16. At its output 12, the enable signal DMA EN for a DMA transfer is supplied. It is derived from the corresponding input signals in accordance with the equation:

$$12 = /1*/2*/3*4*5*6. \tag{8}$$

This signal, as previously described, is received at a respective input of the DMA controller 14 as shown in FIG. 16.

At output 13 an enable signal PIC EN for priority interrupt controller 102 as previously described in conjunction with FIG. 2, is obtained in accordance with an operation specified by the equation:

$$13 = /1*/2*/3*4*5*/6 \tag{9}$$

Output 14 of the enable input/output array 1610 supplies the output control signal D OUT, this signal is derived from respective input signals in accordance with the logic equation:

$$14 = /1*/2*/3*/4*5*6*/9 + 2*/8*/9 \tag{10}$$

A corresponding control signal D IN is applied at output 15; it is generated in accordance with the equation:

$$15 = /1*/2*/3*/4*5*/6*/11 + 2*/7*/11 \tag{11}$$

The load control signal FIFO LD has been described above; a corresponding signal is the read control signal FIFO RD which is supplied at output 16 in accordance with an operation of the enable input/output control array 1610 as specified by the logic equation:

$$16 = /1*/2*/3*/4*/5*6*/11 \tag{12}$$

A read control signal STAT RD for enabling a read of the status port is generated by the logic array and supplied at its output 18 in accordance with the logic equation:

$$18 = /1*/2*/3*/4*5*/6*/11 \tag{13}$$

An input/output write control signal IOWRT is produced at output 19 in accordance with logic equation:

$$19 = /1*/2*/3*/4*/5*/6*/9 \tag{14}$$

This enabling signal enables a further selector circuit 1614 which decodes two address signals ADR02 and ADR03 furnished to its selector inputs. The combination of these two address signals, in case of a write cycle, specifies one of four conditions which are decoded to generate the reset signal CLR SIO carried to the control flipflop 106 previously described in conjunction with FIG. 2. Another one of these signals is the bus controller reset signal CRESET which is carried to the inverter 226 previously described in conjunction with FIG. 7. A third output signal TRIG is a trigger signal supplied to the monostable circuit 526 of the watchdog circuit previously described in conjunction with FIG. 5.

The logic circuitry described in conjunction with Figs. 16 and 17 completes the hardware structure of the signaling input/output processor IOP. All devices and circuits and further means necessary for a better understanding of this processor and its various sections have been described such that the following description of the operation of the sequencing link controller 26 when communicating with the signaling link controllers SLC across the signaling link bus 28 will be apprehended.

Figure 18:
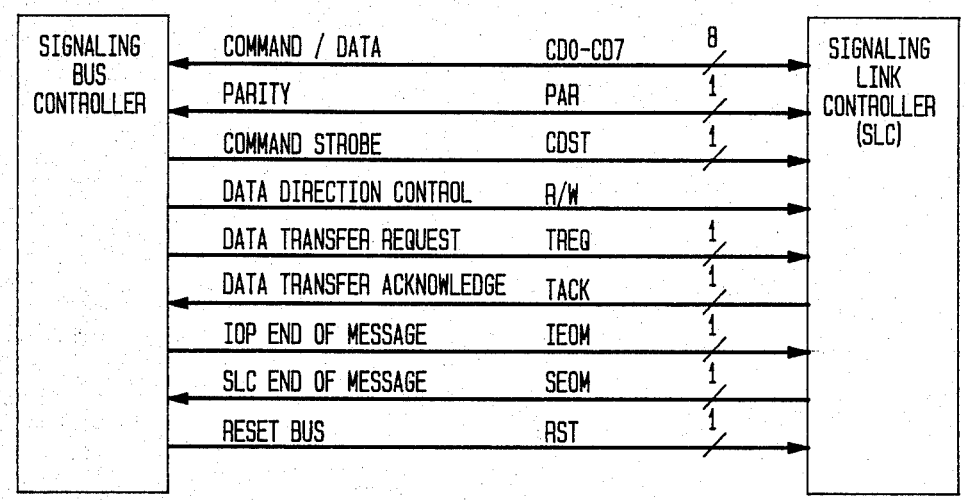
FIG. 18 is a schematic diagram representing the structure of the signaling link bus shown in FIG. 6.

The structure of the signaling link bus 28 is schematically represented in the diagram of FIG. 18, which shows schematically in two blocks the sequencing controller, on one hand, and a signaling link controller SLC, on the other hand. The lines connecting these blocks represent, in combination, the signaling link bus 28. Eight command/data lines CD0 through CD7 and a parity line PAR are bi-directional. A control line is established for transmitting a command strobe CDST to the addressed signaling link controller. The signal condition of this line is high if the data present on the bus is a command. A data direction control line R/W is provided for controlling the direction of the data flow on the command/data lines. The signal condition of this line is low if data is written to the signaling link controller SLC, and correspondingly, it is high, if data is sent from the signaling link controller.

Two further control lines are arranged for transmitting transfer control signals in order to facilitate the hand-shaking procedure. The data transfer request signal TREQ refers to a requested DMA data transfer. This signal is generated by the signaling bus controller 26 for each byte transferred to or from a signaling link controller SLC. The corresponding signal, the transfer acknowledgment signal TACK, is the response of the signaling link controller SLC to the previous transfer request signal TREQ and is sent for each byte transferred to or from the signaling input/output processor IOP.

Further control lines are arranged for transmitting end-of-message signals. The signal IEOM is issued by the signaling bus controller when the last byte of a DMA transfer is transferred to the signaling link controller SLC. Correspondingly, for the opposite direction, the control signal SEOM is the end-of-message indication of a signaling link controller SLC. This signal is issued when the last byte of DMA transfer is transferred to the signaling input/output processor IOP.

The last control line is provided for transmitting a reset control signal RST which resets the bus interface logic of the signaling bus controller 26 and of the selected signaling link controller SLC. It is generated if a data transfer error occurs and enables an orderly reset.

Both the signaling input/output processing IOP and any signaling link controller SLC contain DMA controllers in addition to normal sequencing logic in order to perform data transfers across the signaling link bus 28. Each signaling link controller SLC is selected by means of a unique device address which is part of the command byte, as described above. Each signaling link controller decodes the address portion of the command and determines if it is the signaling link controller currently being addressed. Only the selected signaling link controller will respond to the command byte. The timing of this operation is such that respective devices will respond by placing their status bytes on this bus. In this case, the respective status bytes of the signaling link controllers are sequentially stored in the FIFO memory 227.

Figure 19:
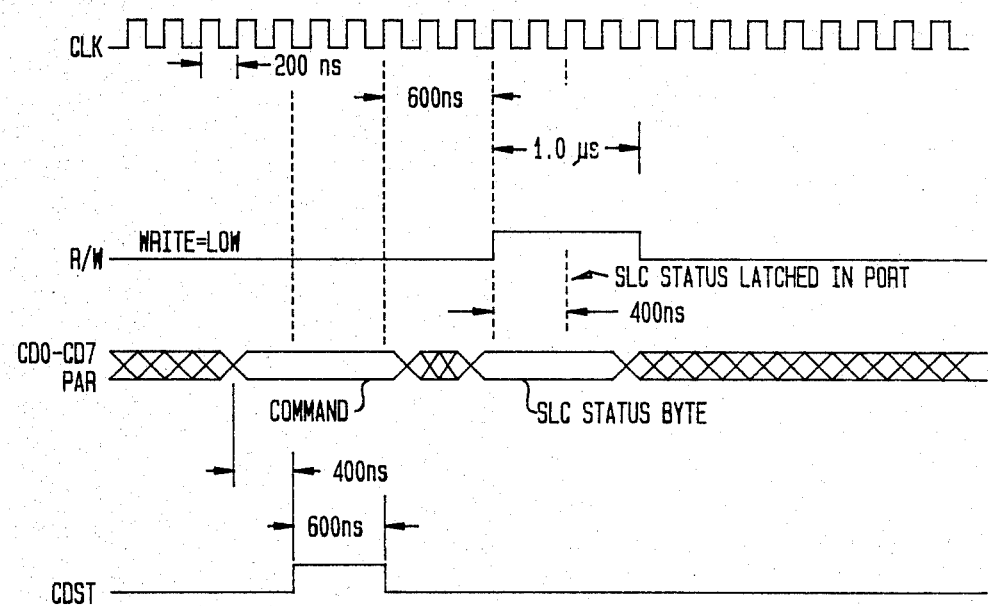
FIG. 19 is a time diagram which represents the time frame of a command byte transfer across the signaling link bus.

As shown in the timing diagram represented in FIG. 19, the signaling bus controller 26 initiates the multiple byte DMA transfer by issuing a command "DMA DATA OUT" to the addressed signaling link controller SLC. This device checks this command byte for a parity error. The signaling link controller then starts transferring the data byte to the selected signaling link controller SLC and issues a transfer request signal TREQ for each byte transferred. Correspondingly, the signaling link controller SLC acknowledges the receipt of each byte by means of the control signal TACK which leading edge occurs when the respective data byte is stored in a memory of the signaling link controller. The trailing edge of the corresponding request signal resets the acknowledgment signal.

The timer of the sequencing bus controller 26 times the duration of the data transfers between the signaling input/output processor IOP and the signaling link controller SLC. If the signaling link controller SLC does not respond with the acknowledgment signal TACK due to a parity error detected, the watchdog of the signaling bus controller 26 will eventually expire in order to generate an error interrupt. The signaling IOP will then issue a bus reset pulse RST to the signaling link controller SLC and thereby generate an error interrupt of the signaling link controller SLC.

If all data bytes are transferred correctly to the selected signaling link controller, the signaling input/output processor IOP issues the end-of-message signal IEOM along with the transfer request signal TREQ when the last byte is transferred to the signaling link controller SLC. This device acknowledges by means of the final acknowledgment signal TACK. An interrupt will then be generated on both the signaling link controller SLC and the signaling bus controller 26 after the trailing edge of this end-of-message signal.

The signaling input/output processor IOP periodically schedules a FIFO scan of all signaling link controllers within a period of about 2 ms in order to determine if one of these devices has a message for the signaling input/output processor IOP. If a particular signaling link controller SLC has a message for the signaling input/output processor IOP, it will respond by issuing a command "DMA DATA IN" to the requesting signaling link controller SLC.

Figure 20:
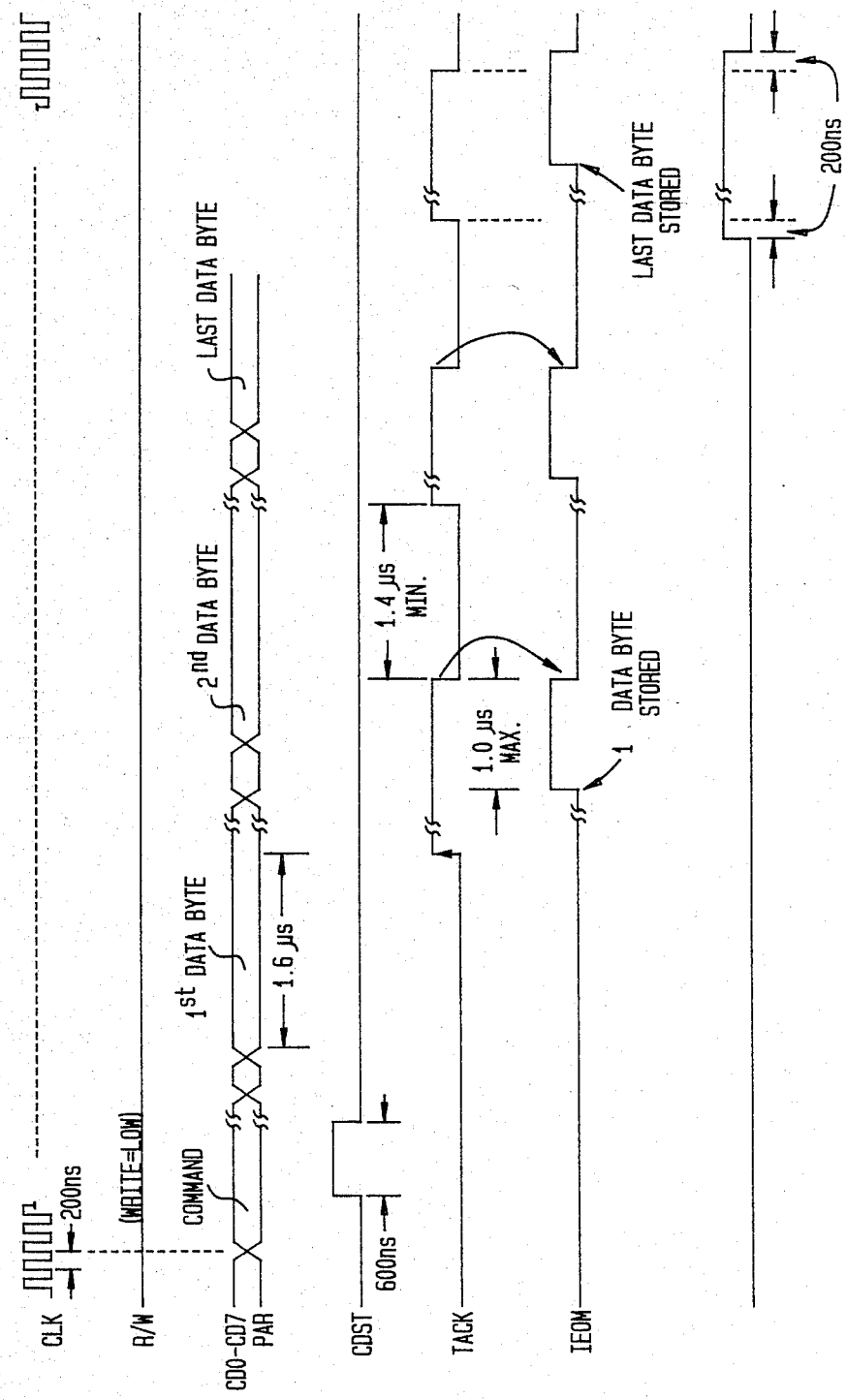
FIG. 20 is another time diagram representing the time frame for a data transfer across the signaling link bus.

As can easily be derived from the corresponding timing diagram shown in FIG. 20, the signaling IOP will then issue the first request signal TREQ for a transfer of the first byte. The addressed signaling link controller SLC will raise the acknowledgment signal TACK thereby indicating that the first byte is available on the bus. The signaling bus controller 26 latches the first data byte into a register of the status-and-data-in port 225. For each byte transferred from the signaling link controller SLC to the signaling input/output processor IOP, this processor will first issue a request signal TREQ and then the signaling link controller SLC will acknowledge with the acknowledgement signal TACK. When the final byte is being transferred from the selected signaling link controller SLC to the signaling input/output processor IOP, the signaling link controller SLC will raise the end-of-message signal SEOM along with the acknowledgement signal TACK. Therefore, the signaling input/output processor IOP resets the request signal TREQ after the transfer of the last data byte, correspondingly, the signaling link controller SLC resets the end of message signal SEOM. An interrupt will then be generated on both the signaling link controller SLC and the signaling input/output processor IOP after the trailing edge of the end of message signal SEOM.

If however, the parity generating and testing device 246 of the signaling bus controller 26 detects a parity error in a data byte transferred from the signaling link controllers SLC, no further request signals TREQ will be issued. Eventually, the watchdog of the signaling bus controller 26 expires and this creates an error interrupt in the signaling input/output processor IOP. Accordingly, the reset signal RST is issued to the signaling link controller SLC which initiates an error interrupt in this device.

The timing diagram for routine data transfers in opposite direction corresponds to the timing diagram represented in FIG. 20, except for the condition of the data direction control signal R/W which is low in FIG. 20 in order to indicate a transfer "DMA DATA OUT". Correspondingly, the signal condition is high for data transfer "DMA DATA IN".

There has thus been shown and described a novel signaling input/output processor IOP suitable for common channel signaling in conjunction with a digital telecommunication system which processor and related transfer networks fulfill all the objects and advantages sought therefor. Many changes, modifications, variations and other uses and applications of the subject invention will, however, become more apparent to those skilled in the art after considering the specification and the accompanying drawings, which disclose a preferred embodiment thereof. All such changes, modifications, variations and other uses and applications which do not depart from the spirit and scope of the invention are deemed to be covered by the invention which is limited only by the claims which follow.

APPENDIX A

Definition of Control and Test Signals of the Signaling Bus Controller

| LEVEL | DEFINITIONS | SET | RST | |
|-------|-------------|-----|-----|---|
| L0 | LENCOMMDAT | 08 | 00 | ;ENABLE/DISABLE COMMAND DATA REG |
| L1 | LEVNOP | 09 | 01 | ;RESET LEVEL FOR ONE CYCLE NOP |
| L2 | HENDRVR | 0A | 02 | ;ENABLE/DISABLE DRIVERS |
| L3 | HR/W | 0B | 03 | ;EN/DISABLE RCVRS,SET/RESET R/W |
| L4 | HCDST | 0C | 04 | ;SET/RESET COMMAND DATA STROBE |
| L5 | HTREQ | 0D | 05 | ;SET/RESET TRANSFER REQUEST |
| L6 | HIEOM | 0E | 06 | ;SET/RESET IOP END OF MESSAGE |
| L7 | NOT USED | 0F | 07 | ; |
| L8 | HDREQ0 | 18 | 10 | ;SET/RESET DMA WRITE REQUEST |
| L9 | HDREQ1 | 19 | 11 | ;SET/RESET DMA READ REQUEST |
| L10 | NOT USED | 1A | 12 | ; |
| L11 | NOT USED | 1B | 13 | ; |
| L12 | LCLRFIFO | 1C | 14 | ;SET/RESET FIFO CLEAR |
| L13 | NOT USED | 1D | 15 | ; |
| L14 | HENCNTR | 1E | 16 | ;ENABLE/DISABLE ADDRESS COUNTER |
| L15 | HFLAG | 1F | 17 | ;FLAG FOR CONTROLLER USE |

```
PULSE      DEFINITIONS      CODE

P0         LCLKDATIN        2F        ;WRITE DATA TO INPUT REGISTER
P1         LCLKFIFO         3F        ;WRITE DATA TO FIFO
P2         LCLKCNTR         4F        ;INCREMENT ADDRESS COUNTER
P3         LNORMINT         5F        ;REQUEST NORMAL INTERRUPT
P4         LCLRFF           6F        ;CLEAR PARITY & EOP FF'S
P5         LCLRCOMM         7F        ;CLEAR COMMAND FF

TEST DEFINITIONS            CODE (CONDITIONAL JUMP)

T0         HDONE            B8        ;LOW TRUE COMMAND ACTIVE
T1         HCDAT7           B9        ;COMMAND/DATA BIT 7
T2         HCDAT6           BA        ;COMMAND/DATA BIT 6
T3         HCDAT5           BB        ;COMMAND/DATA BIT 5
T4         HTACK            BC        ;TRANSFER ACKNOWLEDGE
T5         HSEOM            BD        ;SLC END OF MESSAGE
T6         HPARERR          BE        ;PARITY ERROR FF
T7         HEOP             BF        ;DMA END OF PROCESS

T8         LDACK0           F8        ;DMA WRITE ACKNOWLEDGE
T9         LDACK1           F9        ;DMA READ ACKNOWLEDGE
T10        HCNTCOMP         FA        ;ADDRESS COUNT COMPLETE
T11        NOT USED         FB        ;
T12        NOT USED         FC        ;
T13        HFLAG            FD        ;CONTROLLER FLAG
T14        +V               FE        ;ALWAYS TRUE
T15        GND              FF        ;ALWAYS FALSE
```

---

APPENDIX B

Instruction Set of the Signaling Bus Controller

Control Operations:

```
Hex Code      Instruction      Mnemonic        Function

08/00         Set/Res  L0      LENCOMMDAT      Enable/Disable command data reg.
09/01         Set/Res  L1      LEVNOP          No operation (one cycle)
0A/02         Set/Res  L2      HENDRVR         Enable/Disable SLC bus drivers
0B/03         Set/Res  L3      HR/W            Enable/Disable SLC bus receivers
                                               and set/reset R/W line.

0C/04         Set/Res  L4      HCDST           Set/Reset command data strobe
0D/05         Set/Res  L5      HTREQ           Set/Reset Transfer Request
0E/06         Set/Res  L6      HIEOM           Set/Reset IOP End of Message
0F/07         Set/Res  L7      NOT USE         Not Used 18/10         Set/Res  L8      HDREQ0          Set/Reset DMA Chan 0 request
19/11         Set/Res  L9      HDREQ1          Set/Reset DMA Chan 1 request
1A/12         Set/Res  L10     NOT USE         Not Used
```

| | | | | |
|---|---|---|---|---|
| 1B/13 | Set/Res L11 | NOT USE | Not Used | |
| 1C/14 | Set/Res L12 | LCLRFIF | Set/Reset FIFO clear | |
| 1D/15 | Set/Res L13 | NOT USE | Not Used | |
| 1E/16 | Set/Res L14 | HENCNTR | Enable/Disable address counter | |
| 1F/17 | Set/Res L15 | HFLAG | Set/Reset program flag | |
| 2F | Pulse P0 | LCLKDATIN | Write data to input register | |
| 3F | Pulse P1 | LCLKFIFO | Write data to FIFO | |
| 4F | Pulse P2 | LCLKCNTR | Increment address counter | |
| 5F | Pulse P3 | LNORMINT | Request normal interrupt | |
| 6F | Pulse P4 | LCLRFF | Clear parity & EOP flip-flops | |
| 7F | Pulse P5 | LCLRCOMM | Clear command flip-flop | |

Branch Operations (Unconditional):

| 1st Byte | 2nd Byte | Instruction | Function |
|---|---|---|---|
| C7 | XX | POP | Stack 0 to program counter |
| E7 | XX | Push | Program counter to Stack 0 |
| C6 | XX | RTS | Jump to Stack 0, pop stack |
| E6 | XX | JSR(Stack) | Jump to Stack 0, push stack |
| D6 | XX | JMP(Stack) | Jump to Stack 0 |
| CE | ADDR | JMP D (POP) | Jump to ADDR, pop stack |
| EE | ADDR | JSR D (PUSH) | Jump to ADDR, push stack |
| FE | ADDR | JMP D | Jump to ADDR |
| FF | XX | NOP | No operation (two cycle) |

Branch Operations (Conditional):

| 1st Byte | 2nd Byte | Instruction | Mnemonic | Jump to ADDR if: |
|---|---|---|---|---|
| B8 | ADDR | TEST T0 | HDONE | Command flip-flop is not set. |
| B9 | ADDR | TEST T1 | HCDAT7 | Controller data bit 7 is true. |
| BA | ADDR | TEST T2 | HCDAT6 | Controller data bit 6 is true. |
| BB | ADDR | TEST T3 | HCDAT5 | Controller data bit 5 is true. |
| BC | ADDR | TEST T4 | HTACK | TACK is true. |
| BD | ADDR | TEST T5 | HSEOM | SECM is true. |
| BE | ADDR | TEST T6 | HPARERR | Parity error flip-flop is set. |
| BF | ADDR | TEST T7 | HEOP | DMA end of process flip-flop set. |
| F8 | ADDR | TEST T8 | LDACK0 | DMA Chan 0 DACK is true. |
| F9 | ADDR | TEST T9 | LDACK1 | DMA Chan 1 DACK is true. |
| FA | ADDR | TEST T10 | HCNTCOMP | Address count is complete. |
| FB | ADDR | TEST T11 | NOT USED | Not used. |
| FC | ADDR | TEST T12 | NOT USED | Not used. |
| FD | ADDR | TEST T13 | HFLAG | Controller firmware flag is set. |
| FE | ADDR | TEST T14 | UNCOND | |
| FF | ADDR | TEST T15 | UNCOND | |

APPENDIX C

PROGRAM OF THE SIGNALING BUS CONTROLLER

```
LABEL    LOC    INSTRUCTION      CODE      COMMENTS

START    00     NOP              FF        ;NO OPERATION
         01     NOP              FF        ;NO OPERATION
         02     LCLRCOMM         7F        ;CLEAR COMMAND ACTIVE FF
         03     HR/W-R           03        ;READ/WRITE=WRITE
         04     HENCNTR-R        16        ;COUNTER OUTPUT DISABLED
```

|  |  | 05 | HCDST-R | 04 | ;COMMAND STROBE DISABLED |
|---|---|---|---|---|---|
|  |  | 06 | LCLRFIFO-R | 14 | ;CLEAR FIFO CONTENTS |
|  |  | 07 | HDREQ0-R | 10 | ;DISABLE INPUT DATA REQUEST |
|  |  | 08 | HDREQ1-R | 11 | ;DISABLE OUTPUT DATA REQUEST |
|  |  | 09 | HFLAG-R | 17 | ;RESET PROGRAM FLAG |
|  |  | 0A | HTREQ-R | 05 | ;RESET TRANSFER REQUEST |
|  |  | 0B | HIEOM-R | 06 | ;RESET IEOM |
|  |  | 0C | LENCOMMDAT-R | 00 | ;ENABLE COMMAND/DATA REGISTER |
|  |  | 0D | HENDRVR-S | 0A | ;ENABLE SLC BUS DRIVERS |
|  |  | 0E | LCLRFIFO-S | 1C | ;ENABLE FIFO |
|  |  | 0F | UNCOND | FE | ;BRANCH TO WAIT FOR COMMAND |
|  |  | 10 | GOTO COMWAIT | 16 | ; |
| DONEINT |  | 11 | LNORMINT | 5F | ;REQUEST NORMAL INTERRUPT |
| DONE |  | 12 | HR/W-R | 03 | ;BUS DIRECTION = OUT |
|  |  | 13 | HENDRVR-S | 0A | ;ENABLE DRIVERS |
|  |  | 14 | LCLRCOMM | 7F | ;CLEAR COMMAND FF |
|  |  | 15 | LENCOMMDAT-R | 00 | ;ENABLE COMMAND/DATA REGISTER |
| COMWAIT |  | 16 | IF HDONE | B8 | ;CHK FOR COMMAND |
|  |  | 17 | GOTO COMWAIT | 16 | ;GO TO COMWAIT & CHECK AGAIN |
| COMM |  | 18 | LCLRFF | 6F | ;CLEAR PARITY & EOP FF |
|  |  | 19 | IF HCDAT7 | B9 | ;CHECK COMMAND BIT 7 |
|  |  | 1A | GOTO CHK6 | 21 | ;IF TRUE, CHECK FURTHER |
|  |  | 1B | IF HCDAT6 | BA | ;CHECK COMMAND BIT 6 |
|  |  | 1C | GOTO CHK5 | 27 | ;IF TRUE, CHECK FURTHER |
|  |  | 1D | IF HCDAT5 | BB | ;CHECK COMMAND BIT 5 |
|  |  | 1E | GOTO STATMST | E0 | ;SLC STATUS OR SET MSTR COMMAND |
|  |  | 1F | UNCOND | FE | ;OTHERWISE |
|  |  | 20 | GOTO MCLR | F0 | ;COMMAND IS MASTER CLEAR |
| CHK6 |  | 21 | IF HCDAT6 | BA | ;CHECK COMMAND BIT 6 |
|  |  | 22 | GOTO CHK5A | 3C | ;IF TRUE, ILLEGAL COMMAND |
|  |  | 23 | IF HCDAT5 | BB | ;CHECK COMMAND BIT 5 |
|  |  | 24 | GOTO DATOUT | 42 | ;IF TRUE, DATA OUT COMMAND |
|  |  | 25 | UNCOND | FE | ;OTHERWISE |
|  |  | 26 | GOTO DATIN | 72 | ;COMMAND IS DATA IN |
| CHK5 |  | 27 | IF HCDAT5 | BB | ;CHECK COMMAND BIT 5 |
|  |  | 28 | GOTO STATMST | E0 | ;IF TRUE, SET BUS MASTER |
| FIFO |  | 29 | LENCOMMDAT-S | 08 | ;DISABLE COMM, DATA REGISTER |
| FIFO1 |  | 2A | HENCNTR-S | 1E | ;ENABLE ADDRESS COUNTER |
|  |  | 2B | HENDRVR-S | 0A | ;ENABLE DRIVERS |
|  |  | 2C | LEVNOP-R | 01 | ;NO OPERATION |
|  |  | 2D | HCDST-S | 0C | ;COMMAND STROBE SET |
|  |  | 2E | NOP | FF | ;NO OPERATION |
|  |  | 2F | NOP | FF | ;NO OPERATION |
|  |  | 30 | HCDST-R | 04 | ;COMMAND STROBE RESET |
|  |  | 31 | HENDRVR-R | 02 | ;DISABLE DRIVERS |
|  |  | 32 | HENCNTR-R | 16 | ;DISABLE ADDRESS COUNTER |
|  |  | 33 | HR/W-S | 0B | ;ENABLE RCVRS, SET R/W |
|  |  | 34 | LEVNOP-R | 01 | ;NO OPERATION |
|  |  | 35 | LCLKFIFO | 3F | ;READ SLC DATA |
|  |  | 36 | LCLKCNTR | 4F | ;INCREMENT ADDRESS COUNTER |
|  |  | 37 | HR/W-R | 03 | ;DISABLE RCVRS, R/W RESET |
|  |  | 38 | IF HCNTCOMP | FA | ;CHECK FOR LAST ADDRESS |
|  |  | 39 | GOTO DONEINT | 11 | ;IF TRUE, DONE |
|  |  | 3A | UNCOND | FE | ;LOOP FOR NEXT ADDRESS |
|  |  | 3B | GOTO FIFO1 | 2A | ; |
| CHK5A |  | 3C | IF HCDAT5 | BB | ;CHECK COMMAND BIT 5 |
|  |  | 3D | GOTO DMATST | A0 | ;IF TRUE, DMA TEST COMMAND |
|  |  | 3E | UNCOND | FE | ;OTHERWISE |
|  |  | 3F | GOTO FIFTST | B1 | ;BRANCH TO FIFO TEST COMMAND |
| DATOUT |  | 42 | HCDST-S | 0C | ;COMMAND STROBE SET |
|  |  | 43 | HFLAG-S | 1F | ;SET FLAG |
|  |  | 44 | LEVNOP-R | 01 | ;DELAY FOR COMMAND STROBE |

|         | 45 | HCDST-R        | 04 | ;COMMAND STROBE RESET         |
|         | 46 | UNCONDSR       | EE | ;FETCH DATA BYTE              |
|         | 47 | GOTO FETCH     | D0 | ;                             |
| DATOUT1 | 48 | IF HFLAG       | FD | ;CHECK FLAG                   |
|         | 49 | GOTO DATOUT5   | 56 | ;IF SET, MORE DATA            |
|         | 4A | HIEOM-S        | 0E | ;END OF MESSAGE SET           |
|         | 4B | HTREQ-S        | 0D | ;TREQ SET                     |
| DATOUT2 | 4C | IF HTACK       | BC | ;CHECK TACK                   |
|         | 4D | GOTO DATOUT3   | 50 | ;IF TRUE, CONTINUE            |
|         | 4E | UNCOND         | FE | ;OTHERWISE, WAIT              |
|         | 4F | GOTO DATOUT2   | 4C | ;                             |
| DATOUT3 | 50 | HTREQ-R        | 05 | ;TREQ RESET                   |
|         | 51 | HIEOM-R        | 06 | ;END OF MESSAGE RESET         |
| DATOUT4 | 52 | IF HTACK       | BC | ;CHECK TACK                   |
|         | 53 | GOTO DATOUT4   | 52 | ;IF TRUE, WAIT                |
|         | 54 | UNCOND         | FE | ;OTHERWISE, DONE              |
|         | 55 | GOTO DONEINT   | 11 | ;                             |
| DATOUT5 | 56 | HTREQ-S        | 0D | ;TREQ SET                     |
|         | 57 | UNCONDSR       | EE | ;FETCH DATA BYTE              |
|         | 58 | GOTO FETCH     | D0 | ;                             |
| DATOUT6 | 59 | IF HTACK       | BC | ;CHECK TACK                   |
|         | 5A | GOTO DATOUT7   | 5D | ;IF TRUE, CONTINUE            |
|         | 5B | UNCOND         | FE | ;OTHERWISE, WAIT              |
|         | 5C | GOTO DATOUT6   | 59 | ;                             |
| DATOUT7 | 5D | HTREQ-R        | 05 | ;TREQ RESET                   |
| DATOUT8 | 5E | IF HTACK       | BC | ;CHECK TACK                   |
|         | 5F | GOTO DATOUT8   | 5E | ;IF TRUE, WAIT                |
|         | 60 | UNCOND         | FE | ;BRANCH FOR NEXT PASS         |
|         | 61 | GOTO DATOUT1   | 48 | ;                             |
| DATIN   | 72 | HCDST-S        | 0C | ;COMMAND STROBE SET           |
|         | 73 | HFLAG-S        | 1F | ;SET FLAG                     |
|         | 74 | LEVNOP-R       | 01 | ;DELAY FOR COMMAND STROBE     |
|         | 75 | HCDST-R        | 04 | ;COMMAND STROBE RESET         |
|         | 76 | HENDRVR-R      | 02 | ;DISABLE DRIVERS              |
|         | 77 | LENCOMMDAT-S   | 08 | ;DISABLE COMM, DATA REGISTER  |
|         | 78 | HR/W-S         | 0B | ;ENABLE RCVRS, SET R/W        |
|         | 79 | HTREQ-S        | 0D | ;TREQ SET                     |
| DATIN1  | 7A | IF HTACK       | BC | ;CHECK TACK                   |
|         | 7B | GOTO DATIN2    | 7E | ;IF TRUE, CONTINUE            |
|         | 7C | UNCOND         | FE | ;OTHERWISE, WAIT              |
|         | 7D | GOTO DATIN1    | 7A | ;                             |
| DATIN2  | 7E | IF HSEOM       | BD | ;CHECK SLC END OF MESSAGE     |
|         | 7F | GOTO DATIN3    | 82 | ;IF TRUE, BRANCH TO CLR FLAG  |
|         | 80 | UNCOND         | FE | ;OTHERWISE, CONTINUE          |
|         | 81 | GOTO DATIN4    | 83 | ;                             |
| DATIN3  | 82 | HFLAG-R        | 17 | ;FLAG CLEARED                 |
| DATIN4  | 83 | LCLKDATIN      | 2F | ;READ DATA                    |
| DATIN5  | 84 | IF HPARERR     | BE | ;CHECK PARITY ERROR           |
|         | 85 | GOTO DATIN5    | 84 | ;IF TRUE, LOOP UNTIL TIMEOUT  |
|         | 86 | HTREQ-R        | 05 | ;DROP TREQ                    |
| DATIN6  | 87 | IF HTACK       | BC | ;CHECK TACK                   |
|         | 88 | GOTO DATIN6    | 87 | ;LOOP UNTIL FALSE             |
|         | 89 | IF HFLAG       | FD | ;CHECK FLAG                   |
|         | 8A | GOTO DATIN9    | 93 | ;BRANCH IF MORE DATA          |
|         | 8B | HDREQ0-S       | 18 | ;SET DMA WRITE REQUEST        |
| DATIN7  | 8C | IF LDACK0      | F8 | ;CHECK DMA ACKNOWLEDGE        |
|         | 8D | GOTO DATIN7    | 8C | ;WAIT UNTIL TRUE              |
|         | 8E | HDREQ0-R       | 10 | ;RESET DMA REQUEST            |
| DATIN8  | 8F | IF LDACK0      | F8 | ;CHECK DMA ACKNOWLEDGE        |
|         | 90 | GOTO DONEINT   | 11 | ;IF FALSE, DONE               |
|         | 91 | UNCOND         | FE | ;OTHERWISE, LOOP UNTIL DONE   |
|         | 92 | GOTO DATIN8    | 8F | ;                             |
| DATIN9  | 93 | HTREQ-S        | 0D | ;SET TREQ FOR NEXT DATA       |

|        | 94  | HDREQ0-S     | 18 | ;SET DMA REQUEST TO STORE LAST DATA |
| DATINA | 95  | IF LDACK0    | F8 | ;CHECK DMA ACKNOWLEDGE |
|        | 96  | GOTO DATINA  | 95 | ;WAIT UNTIL TRUE |
|        | 97  | HDREQ0-R     | 10 | ;DROP DMA REQUEST |
| DATINB | 98  | IF LDACK0    | F8 | ;CHECK DMA ACKNOWLEDGE |
|        | 99  | GOTO DATIN1  | 7A | ;IF FALSE, LOOP |
|        | 9A  | UNCOND       | FE | ;OTHERWISE, WAIT |
|        | 9B  | GOTO DATINB  | 98 | ; |
| DMATST | A0  | HENDRVR-R    | 02 | ;TURN OFF BUS DRIVERS |
|        | A1  | HFLAG-S      | 1F | ;SET PROGRAM FLAG |
| DMATST1| A2  | UNCONDSR     | EE | ;FETCH DATA BYTE |
|        | A3  | GOTO FETCH   | D0 | ; |
|        | A4  | LCLKDATIN    | 2F | ;LOAD INPUT REGISTER |
|        | A5  | HDREQ0-S     | 18 | ;REQUEST TRANSFER TO MEMORY |
| DMATST2| A6  | IF LDACK0    | F8 | ;CHECK DMA ACKNOWLDGE |
|        | A7  | GOTO DMATST2 | A6 | ;WAIT UNTIL TRUE |
|        | A8  | HDREQ0-R     | 10 | ;RESET DMA REQUEST |
| DMATST3| A9  | IF LDACK0    | F8 | ;CHECK DMA ACKNOWLEDGE |
|        | AA  | GOTO DMATST4 | AD | ;IF FALSE, DONE |
|        | AB  | UNCOND       | FE | ;OTHERWISE |
|        | AC  | GOTO DMATST3 | A9 | ;LOOP UNTIL DONE |
| DMATST4| AD  | IF HFLAG     | FD | ;CHECK IF LAST BYTE |
|        | AE  | GOTO DMATST1 | A2 | ;IF NOT, REPEAT |
|        | AF  | UNCOND       | FE | ;DONE |
|        | B0  | GOTO DONEINT | 11 | ; |
| FIFTST | B1  | HENDRVR-R    | 02 | ;TURN OFF BUS DRIVERS |
|        | B2  | LENCOMMDAT-S | 08 | ;TURN OFF COMMAND REGISTER |
|        | B3  | HENCNTR-S    | 1E | ;TURN ON ADDRESS COUNTER |
|        | B4  | LEVNOP-R     | 01 | ;DELAY |
| FIFTST1| B5  | LCLKFIFO     | 3F | ;LOAD FIFO |
|        | B6  | LCLKCNTR     | 4F | ;ADVANCE ADDRESS COUNTER |
|        | B7  | LEVNOP-R     | 01 | ;DELAY |
|        | B8  | IF HCNTCOMP  | FA | ;CHECK FOR LAST ADDRESS |
|        | B9  | GOTO FIFTS2  | BC | ;BRANCH IF TRUE |
|        | BA  | UNCOND       | FE | ;OTHERWISE |
|        | BB  | GOTO FIFTST1 | B5 | ;REPEAT |
| FIFTST2| BC  | HECNTR-R     | 16 | ;TURN OFF ADDRESS COUNTER |
|        | BD  | UNCOND       | FE | ;DONE |
|        | BE  | GOTO DONEINT | 11 | ; |
| FETCH  | D0  | HDREQ1-S     | 19 | ;DMA READ REQUEST SET |
| FETCH1 | D1  | IF LDACK1    | F9 | ;WAIT FOR DMA ACKNOWLEDGE |
|        | D2  | GOTO FETCH1  | D1 | ; |
|        | D3  | HDREQ1-R     | 11 | ;DMA REQUEST RESET |
| FETCH2 | D4  | IF LDACK1    | F9 | ;CHECK IF DMA COMPLETE |
|        | D5  | GOTO FETCH3  | D8 | ;IF TRUE, CONTINUE |
|        | D6  | UNCOND       | FE | ;OTHERWISE, WAIT |
|        | D7  | GOTO FETCH2  | D4 | ; |
| FETCH3 | D8  | IF HEOP      | BF | ;CHECK END OF PROCESS |
|        | D9  | GOTO FETCH4  | DC | ;IF TRUE, BRANCH TO CLR FLAG |
|        | DA  | UNCONDRT     | C6 | ;UNCONDITIONAL RETURN |
|        | DB  | RETURN       | FF | ; |
| FETCH4 | DC  | HFLAG-R      | 17 | ;CLEAR FLAG |
|        | DD  | UNCONDRT     | C6 | ;UNCONDITIONAL RETURN |
|        | DE  | RETURN       | FF | ; |

```
STATMST  E0   HCDST-S         0C    ;COMMAND STROBE SET
         E1   NOP             FF    ;NO OPERATION
         E2   NOP             FF    ;NO OPERATION
         E3   HCDST-R         04    ;COMMAND STOBE RESET
         E4   HENDRVR-R       02    ;DISABLE DRIVERS
         E5   LENCOMMDAT-S    08    ;DISABLE COMM/DATA REGISTER
         E6   HR/W-S          0B    ;ENABLE RCVRS, SET R/W
         E7   LEVNOP-R        01    ;NO OPERATION
         E8   LCLKDATIN       2F    ;READ SLC STATUS
         E9   UNCOND          FE    ;BRANCH TO DONE
         EA   GOTO DONE       12    ;

MCLR     F0   HCDST-S         0C    ;COMMAND STROBE SET
         F1   NOP             FF    ;NO OPERATION
         F1   NOP             FF    ;NO OPERATION
         F3   NOP             FF    ;NO OPERATION
         F4   NOP             FF    ;NO OPERATION
         F5   LEVNOP-R        01    ;NO OPERATION
         F6   HCDST-R         04    ;COMMAND STROBE RESET
         F7   UNCOND          FE    ;BRANCH TO DONE
         F8   GOTO DONE       12    ;
```

APPENDIX D

Memory Map of Controller PROM

```
0000    FF FF 7F 03 16 04 14 10 11 17 05 06 00 0A 1C FE
0010    16 5F 03 0A 7F 00 B8 16 6F B9 21 BA 27 BB E0 FE
0020    F0 BA 3C BB 42 FE 72 BB E0 08 1E 0A 01 0C FF FF
0030    04 02 16 0B 01 3F 4F 03 FA 11 FE 2A BB A0 FE B1
0040    FF FF 0C 1F 01 04 EE D0 FD 56 0E 0D BC 50 FE 4C
0050    05 06 BC 52 FE 11 0D EE D0 BC 5D FE 59 05 BC 5E
0060    FE 48 FF FF FF FF FF FF FF FF FF FF FF FF FF FF
0070    FF FF 0C 1F 01 04 02 08 0B 0D BC 7E FE 7A BD 82
0080    FE 83 17 2F BE 84 05 BC 87 FD 93 18 F8 8C 10 F8
0090    11 FE 8F 0D 18 F8 95 10 F8 7A FE 98 FF FF FF FF
00A0    02 1F EE D0 2F 18 F8 A6 10 F8 AD FE A9 FD A2 FE
00B0    11 02 08 1E 01 3F 4F 01 FA BC FE B5 16 FE 11 FF
00C0    FF FF FF FF FF FF FF FF FF FF FF FF FF FF FF FF
00D0    19 F9 D1 11 F9 D8 FE D4 BF DC C6 FF 17 C6 FF FF
00E0    0C FF FF 04 02 08 0B 01 2F FE 12 FF FF FF FF FF
00F0    0C FF FF FF FF 01 04 FE 12 FF FF FF FF FF FF FF
```

What is claimed is:

1. An input/output processing module providing common channel signaling and being arranged in a central control unit of a digital telecommunications system, said system being composed of a plurality of central offices each including a respective central control unit, a central switching network and a plurality of line trunk group units forming interfaces of transmission lines of the telecommunication system to the switching network, said transmission lines including trunks dedicated to transferring signaling information and being associated at each end with respective signaling link controllers, wherein the central control unit has a main processing system including a central system bus, and said input/output processing module, forming an independent module residing on this central system bus, is dedicated to processing of signaling control information to be exchanged between the central processing system and said signaling link controllers, said input/output processing module comprising:
- a microprocessor system provided for initiating, starting and controlled resetting of signaling information transfer operations under supervision of the central processing system by means of respective input/output control commands and having a system bus interface unit connected to the central system bus, a microprocessor unit, a local memory unit and a microprocessor bus interconnecting said units of the microprocessor system;
- a further bus arrangement constituting a signaling link bus and being commonly connected to said signaling link controllers; and
- a signaling link bus control arrangement connected to both the microprocessor bus and the signaling link bus and including programmable control means for sequentially executing transfer operations of signaling information and related input/output control information, and further including interface means being independently accessible by both the microprocessor system and the control means of the signaling link bus control arrangement for enabling bi-directional data transfers between the microprocessor system and said control means.

2. The input/output processing module as recited in claim 1, wherein the microprocessor system further comprises a direct memory access control unit controlling routine movement of data between the local memory unit and the signaling link bus control arrangement and including two direct memory access channels each assigned to input data transfers directed from the signaling link controllers to the input/output processing module, and corresponding output data transfers transmitted in the opposite direction, respectively.

3. The input/output processing module as recited in claim 2, wherein the direct memory access controller unit is connected to the microprocessor unit for furnishing a hold signal deactivating the control of the microprocessor unit over the microprocessor bus during direct memory access transfers.

4. The input/output processing module as recited in claim 1, wherein the system bus interface unit of the microprocessor system further comprises an address comparator connected to receive a module address transmitted along the central system bus for comparison with a fixed address assigned to the input/output processing module, and said address comparator has an output furnishing an activating selection signal upon identity of such addresses.

5. The input/output processing module as recited in claim 4, wherein the system bus interface unit of the microprocessor system further comprises:
- a command decoder having an enable input connected to the output of said address comparator, data inputs connected to receive a command code transmitted across the central system bus, and outputs each corresponding to a respective one of said input/output control commands and being activated upon decoding of the respective command received at the data inputs; and
- a data transceiver unit having first inputs and outputs connected to the central system bus and second inputs and outputs connected to the microprocessor system, and being designed to receive and transmit data information between the central processing system and the input/output processing module.

6. The input/output processing module as recited in claim 1, further comprising a priority interrupt controller for enabling the microprocessor system to recognize internal interrupt conditions and external service requests received from the supervising central processing system and the sub-ordinate signaling link controller arrangement, respectively.

7. The input/output processing module as recited in claim 6, wherein the priority interrupt controller comprises:
- first selector inputs each connected to receive a respective one of control signals each representing a corresponding interrupt condition derived from one of said input/output control commands and a system failure signal, respectively;
- second selector inputs each connected to receive one of further control signals representing an internal interrupt condition and a request status of the signaling bus control arrangement; and
- data outputs connected to the microprocessor system bus furnishing in combination a code for the interrupt condition having currently the highest priority; and
- an interrupt request output directly connected to a respective interrupt input of the microprocessor unit.

8. The input/output processing module as recited in claim 7, wherein the microprocessor unit includes a ready input and the microprocessor system further comprises:
- a timeout counter, having an output connected to one of the interrupt inputs of the priority interrupt controller and furnishing a periodic interrupt request for initiating a refresh command to be issued by the microprocessor unit; and
- a watchdog circuit forming a continuous timer, having inputs connected to receive said refresh command for being reset to a start condition and having an output furnishing a control signal to the ready input of the microprocessor unit holding this input false whenever a predetermined amount of time has lapsed without issuance of a new refresh command due to a failure condition.

9. The input/output processing module as recited in claim 1, wherein the microprocessor system is designed as a 16-bit microprocessor system and the microprocessor system bus comprises a multiplexed byte-oriented structure of address and data bus lines and includes latches, each connected to a corresponding group of bus lines and being enabled by the microprocessor unit and the direct memory access controller, respectively.

10. The input/output processing module as recited in claim 9, wherein the microprocessor system residing on the central system bus as one of several processing modules cooperating with the main processing system including a page-oriented main memory unit is designed to share utilization of this main memory unit with other central processing system facilities and further includes a page register having inputs connected to receive, in combination, a page address for the main memory unit from respective ones of the data lines of the microprocessor system bus, said register containing register elements for storing said page address and outputs; and wherein the system bus interface unit further includes a bus address buffer having first inputs connected to a respective one of the outputs of said page register, second inputs being connected to said address bus lines determining in combination an address of the main memory unit within the specified memory page and said address buffer having outputs connected to the central system bus.

11. The input/output processing module as recited in claim 9, wherein the signaling link bus control arrangement is designed for processing eight-bit data ports and the interface means of this control arrangement further comprises:
an eight-bit data bus connected for bi-directional data exchange with the microprocessor bus and two data transceiver units connected to said eight-bit data bus provided for receiving and transmitting a low byte and a high byte of a microprocessor data word, respectively;
uni-directional eight-bit ports for transmitting a byte of input data and output data, respectively, under control of said control means for sequentially executing transfer operations, said uni-directional ports having first terminals connected to said eight-bit data bus and second terminals;
a controller bus being connected to said second terminals of said eight-bit ports; and
differential receivers and drivers having first terminals connected to said controller bus and second terminals connected to said signaling link bus.

12. The input/output processing module as recited in claim 10, wherein said control means for sequentially executing transfer operations further comprise:
two cascaded micro sequencing devices each having data inputs, data outputs and control inputs;
a programmable control memory constructed as read only memory having address inputs each connected to a respective one of the data outputs of the microsequencing devices and having data outputs; and
a control register having inputs connected to the data outputs of the programmable control memory and having data outputs each connected to a respective one of said data inputs of said microsequencing devices.

13. The input/output processing module as recited in claim 12, wherein the programmable control memory comprises eight-bit memory locations, the four least significant bits of each memory location designating an address portion and the four most significant bits determining a control signal enable portion; and wherein said data outputs of control register correspondingly provide enable signal outputs and address signal outputs.

14. The input/output processing module as recited in claim 13, wherein the said control means for sequentially executing transfer operations further comprise:
an enable signal decoder having signal inputs each connected to a respective one of said enable signal outputs of the control register and having signal outputs each furnishing a respective one of control pulses; and two cascaded address signal latches each having an enable input, selector inputs and signal outputs, wherein corresponding ones of these selector inputs are commonly connected to a respective one of the least significant address signal outputs of the control register and each control enable input is connected to a respective one of the signal outputs of the enable signal decoder; and the signal outputs of the address signal latches each furnish a respective one of control signal levels.

15. The input/output processing module as recited in claim 14, wherein the control means for sequentially executing transfer operations further comprise:
test signal selectors having data inputs connected to receive respective test signals each specifying a specific operating condition of the signaling link bus control arrangement, selector inputs connected to a respective one of the least significant address signal outputs of the control register for receiving a select code determining the selection of a specific one of said test signals, and said test signal selectors have a test data output furnishing a branch enable signal when the selected test signal is in operating condition representing the true condition of the respective test.

16. The input/output processing module as recited in claim 15, wherein the microsequencing devices include an address source selector input for determining a data source for the next micro instruction and said address source selector input is connected to receive said branch enable signal for providing an address of a micro-instruction specifying a branch operation being conditional upon the result of the respective selected test.

17. The input/output processing module as recited in claim 11, wherein the uni-directional eight-bit ports connected to said byte data bus include a command-and-data-out port provided for receiving command and data information being sent by the microprocessor system to the signaling link bus control arrangement, said information specifying a control operation regarding a selected signaling link controller and a scan operation of all signaling link controllers present at the signaling link bus, respectively.

18. The input/output processing module as recited in claim 13, wherein the signaling link bus control arrangement further comprises a status-and-data-in port connected to receive an incoming status byte and a data byte, respectively, across said controller bus from a selectively addressed signaling link controller.

19. The input/output processing module as recited in claim 18, wherein the signaling bus control arrangement for performing a continuous scan operation of all signaling link controllers being present on the signaling link bus further comprises:
an address counter for providing subsequently incremented addresses for the signaling link controllers, said counter having a count input connected to receive one of said control pulses being activated during each cycle of a scan operation and having address counter outputs;
an address buffer having inputs each connected to a respective one of said address counter outputs, having outputs connected to said controller bus and having an enable input connected to receive a respective one of said control levels;

a first-in-first-out memory having address inputs each connected to a respective one of said address counter outputs, data inputs connected to said controller bus to receive a status byte from the currently selected signaling link controller, data outputs, and a control input connected to receive one of said control pulses in order to initiate a read operation from the first-in-first-out memory and having outputs connected to said byte data bus.

20. The input/output processing module as recited in claim 19, wherein the signaling bus control arrangement further comprises a parity generating and testing device being arranged to generate a parity bit for each data byte going out onto the signaling link bus and being designed to compare each data byte received from the signaling link bus across said differential receivers connected to said signaling link bus, said parity testing and generating device having parallel inputs connected to the controller bus and having an output furnishing the parity bit simultaneously forming one of said test signals, said output of the parity generating and testing device being further connected to said differential drivers connected to the signaling link bus.

21. The input/output processing module as recited in claim 20, wherein said signaling bus control arrangement comprises a further watchdog circuit constituting a short duration timer normally being restarted during a controller arrangement cycle and running out without such refresh whenever a controller sequence fails to complete and is intentionally allowed to hang up in case of a transfer failure, respectively; said watchdog circuit having a trigger signal generated during the controller sequence and an output furnishing a time-out signal supplied to one input of said priority interrupt controller and constituting one of said interrupt requests.

* * * * *